(12) United States Patent
McDaniel et al.

(10) Patent No.: US 8,388,904 B1
(45) Date of Patent: Mar. 5, 2013

(54) EQUIPMENT DECONTAMINATION SYSTEM AND METHOD

(75) Inventors: C. Steven McDaniel, Austin, TX (US); Mauricio Salazar, Houston, TX (US)

(73) Assignee: Reactive Surfaces, Ltd., LLP, Austin, TX (US)

( * ) Notice: Subject to any disclaimer, the term of this patent is extended or adjusted under 35 U.S.C. 154(b) by 269 days.

(21) Appl. No.: 12/644,334

(22) Filed: Dec. 22, 2009

Related U.S. Application Data

(60) Provisional application No. 61/139,802, filed on Dec. 22, 2008.

(51) Int. Cl.
*A61L 2/00* (2006.01)
*C23F 11/02* (2006.01)

(52) U.S. Cl. .......................................... 422/292; 422/9

(58) Field of Classification Search ............... 422/9, 292
See application file for complete search history.

(56) References Cited

U.S. PATENT DOCUMENTS

| | | | |
|---|---|---|---|
| 3,437,514 A | 4/1969 | Burlant | |
| 4,155,887 A | 5/1979 | Hetson | |
| 4,166,804 A | 9/1979 | Bleha et al. | |
| 4,244,693 A | 1/1981 | Guon | |
| 4,324,683 A | 4/1982 | Lim et al. | |
| 4,495,239 A | 1/1985 | Pusch et al. | |
| 4,598,015 A | 7/1986 | Panush | |
| 4,683,202 A | 7/1987 | Mullis | |
| 4,839,046 A | 6/1989 | Chandler | |
| 4,879,236 A | 11/1989 | Smith et al. | |
| 4,988,623 A | 1/1991 | Schwarz et al. | |
| 5,026,650 A | 6/1991 | Schwarz et al. | |
| 5,096,813 A | 3/1992 | Krumhar et al. | |
| 5,137,569 A | 8/1992 | Waldron et al. | |
| 5,153,131 A | 10/1992 | Wolf et al. | |
| 5,169,554 A | 12/1992 | Akkara et al. | |
| 5,391,649 A | 2/1995 | Holmberg | |
| 5,482,996 A | 1/1996 | Russell et al. | |
| 5,484,728 A | 1/1996 | Serdar et al. | |
| 5,589,386 A | 12/1996 | Serdar | |
| 5,627,021 A | 5/1997 | Goodwin et al. | |
| 5,804,694 A | 9/1998 | Bruce et al. | |
| 5,871,986 A | 2/1999 | Boyce | |
| 5,879,440 A | 3/1999 | Sau | |

(Continued)

FOREIGN PATENT DOCUMENTS

| | | |
|---|---|---|
| CA | 2337884 | 2/2000 |
| DE | 203926 | 11/1983 |

(Continued)

OTHER PUBLICATIONS

Broun et al., "Catalytic Plasticity of Fatty Acid Modification Enzymes Underlying Chemical Diversity of Plant Lipids," Science, vol. 282, 1998, pp. 1315-1317.

(Continued)

*Primary Examiner* — Kevin Joyner
(74) *Attorney, Agent, or Firm* — McDaniel & Associates, PC

(57) ABSTRACT

A decontamination system includes a spraying system in an enclosed chamber for application of a decontamination fluid having a liquid carrier, such as water, and an enzyme-based decontaminating chemical additive. The additive contains an organophosphorus compound-degrading enzyme. The decontamination system also includes a fluid flow control system that ensures delivery of decontamination fluid to spray nozzles. The fluid flow control system features a recirculation system that collects runoff from the chamber and transports the collected runoff to a decontamination reactor. The decontamination reactor removes contaminants from the collected runoff liquid and permits the collected runoff liquid to be reused for further decontamination, thus taking advantage of the catalytic characteristic of the enzyme.

14 Claims, 4 Drawing Sheets

U.S. PATENT DOCUMENTS

| | | | |
|---|---|---|---|
| 5,914,123 A | 6/1999 | Arntzen et al. | |
| 5,919,689 A | 7/1999 | Selvig et al. | |
| 5,928,906 A | 7/1999 | Koster et al. | |
| 5,928,927 A | 7/1999 | Cheng et al. | |
| 5,982,927 A | 11/1999 | Koljonen | |
| 5,993,739 A * | 11/1999 | Lyon | 422/31 |
| 5,998,200 A | 12/1999 | Bonaventura et al. | |
| 6,020,312 A | 2/2000 | Edwards | |
| 6,034,298 A | 3/2000 | Lam et al. | |
| 6,054,504 A | 4/2000 | Dalla Riva Toma | |
| 6,087,558 A | 7/2000 | Howard et al. | |
| 6,136,320 A | 10/2000 | Arntzen et al. | |
| 6,291,200 B1 | 9/2001 | LeJeune et al. | |
| 6,469,145 B1 | 10/2002 | Rastogi et al. | |
| 6,485,983 B1 | 11/2002 | Lu et al. | |
| 6,504,085 B1 | 1/2003 | Howard | |
| 6,642,037 B2 | 11/2003 | Gordon et al. | |
| 6,730,144 B2 | 5/2004 | Tanaka et al. | |
| 7,041,285 B2 | 5/2006 | Polsenski et al. | |
| 7,125,842 B2 | 10/2006 | Kawabe et al. | |
| 7,238,669 B2 | 7/2007 | Bishop-Hurley et al. | |
| 7,335,400 B2 | 2/2008 | Russell et al. | |
| 2002/0010228 A1 | 1/2002 | Simendinger, III | |
| 2002/0010229 A1 | 1/2002 | Medoff et al. | |
| 2002/0013385 A1 | 1/2002 | Simendinger, III | |
| 2002/0035239 A1 | 3/2002 | Andersen et al. | |
| 2002/0106361 A1 | 8/2002 | Poulsen et al. | |
| 2002/0132540 A1 | 9/2002 | Soerens et al. | |
| 2003/0047508 A1 | 3/2003 | Boles et al. | |
| 2003/0102007 A1* | 6/2003 | Kaiser | 134/1 |
| 2003/0113902 A1 | 6/2003 | Gordon et al. | |
| 2003/0166237 A1 | 9/2003 | Allermann et al. | |
| 2003/0194445 A1 | 10/2003 | Kuhner et al. | |
| 2004/0109853 A1 | 6/2004 | McDaniel | |
| 2004/0175407 A1 | 9/2004 | McDaniel | |
| 2004/0248783 A1 | 12/2004 | Kawabe et al. | |
| 2005/0147579 A1 | 7/2005 | Schneider et al. | |
| 2006/0160200 A1 | 7/2006 | Rathenow et al. | |

FOREIGN PATENT DOCUMENTS

| | | |
|---|---|---|
| JP | 58198580 | 11/1983 |
| JP | 3239766 | 10/1991 |
| JP | 5247378 | 9/1993 |
| WO | 99/43791 | 9/1999 |
| WO | 99/53037 | 10/1999 |
| WO | 00/64957 | 11/2000 |
| WO | 01/72911 | 10/2001 |
| WO | 03/093462 | 11/2003 |
| WO | 2005/011844 | 2/2005 |

OTHER PUBLICATIONS

Devos et al., "Practical Limits of Function Prediction," Proteins: Structure, Function, and Genetics, vol. 41, 2000, pp. 98-107.

Kisselev, "Polypeptide Release Factors in Prokaryotes and Eukaryotes: Same Function, Different Structure," Structure, vol. 10, 2002, pp. 8-9.

McDaniel et al., "Enzyme-based additives for paints and coatings," Progress in Organic Coatings, vol. 55, 2006, pp. 182-188.

Seffernick et al., "Melamine Deaminase and Atrazine Chlorohydrolase: 98 Percent Identical but Functionally Different," Journal of Bacteriology, vol. 183, No. 8, 2001, pp. 2405-2410.

Witkowski et al., "Conversion of a β-Ketoacyl Synthase to a Malonyl Decarboxylase by Replacement of the Active-Site Cysteine with Glutamine," Biochemistry, vol. 38, 1999, pp. 11643-11650.

Office Action mailed Apr. 28, 2010 for U.S. Appl. No. 12/243,755.

U.S. Appl. No. 60/409,102 entitled Bioactive Protein Paint Additive, Paint, and Painted Various, filed Sep. 9, 2002.

U.S. Appl. No. 07/898,973 entitled Parathion Hydrolase Analogs and Methods for Production and Purification, filed Jun. 15, 1992.

Plueddemann, Silane Coupling Agents, © Plenum Press, pp. 224-229.

Petrikovics et al., "Long circulating liposomes encapsulating organophosphorus acid androlase in diisopropylflurorophosphate antagonism," Toxicological Sciences, vol. 57, 2000, pp. 16-21.

Abstract only for CN1031387, published Mar. 1, 1989.

International Search Report, PCT/US2004/007263, mailed Nov. 16, 2004.

"PPG Installs Cleaning System," PCI Magazine, Jul. 2002, pp. 68-70.

"Copper-8-Quinolinolate Chemistry for Specialty Wood Preservative," PCI Magazine, Jun. 2002, 3 pages.

"Emulsion Polymer Technologies," Paint Research Association, vol. 13, No. 12, Apr. 2002, 24 pages.

"The PCI 50 & Global Top 10," PCI Magazine, Jun. 2002, 34 pages.

Winkowski, "Controlling Microbial Contamination," PCI Magazine, Jun. 2002, 6 pages.

DeFrank et al., "Advanced Catalytic Enzyme System (ACES)—Dual Use Capabilities," U.S. Army Edgewood Chemical Biological Center, 2002, 7 pages.

ASTM Document 912, "Standard Specification for Cuprous Oxide for Use in Antifouling Paints," published by ASTM International, West Conshohocken, PA, Dec. 1981, p. 1.

ASTM Document 964, "Standard Specification for Metallic Copper Powder for Use in Antifouling Paints," published by ASTM International, West Conshohocken, PA, May 2003, p. 1.

ASTM Document 2574, "Standard Test Method for Resistance of Emulsion Paints in the Container to Attack by Microorganisms," published by ASTM International, West Conshohocken, PA, Jun. 2006, pp. 1-4.

ASTM Document 3273, "Standard Test Method for Resistance to Growth of Mold on the Surface of Interior Coatings in an Environmental Chamber," published by ASTM International, West Conshohocken, PA, Feb. 2006, pp. 1-4.

ASTM Document 3274, "Standard Test Method for Evaluating Degree of Surface Disfigurement of Paint Films by Microbial (Fungal or Algal) Growth or Soil and Dirt Accumulation," published by ASTM International, West Conshohocken, PA, Jun. 1995, pp. 1-4.

ASTM Document 3456, "Standard Practice for Determining by Exterior Exposure Tests the Susceptibility of Paint Films to Microbiological Attack," published by ASTM International, West Conshohocken, PA, May 1986, pp. 1-4.

ASTM Document 3623, "Standard Test Method for Testing Antifouling Panels in Shallow Submergence," published by ASTM International, West Conshohocken, PA, Jun. 2004, pp. 1-8.

ASTM Document 4610, "Standard Guide for Determining the Presence of and Removing Microbial (Fungal or Algal) Growth on Paint and Related Coatings," published by ASTM International, West Conshohocken, PA, Jun. 2004, pp. 1-2.

ASTM Document 4938, "Standard Test Method for Erosion Testing of Antifouling Paints Using High Velocity Water," published by ASTM International, West Conshohocken, PA, Jun. 1989, pp. 1-4.

ASTM Document 4939, "Standard Test Method for Subjecting Marine Antifouling Coating to Biofouling and Fluid Shear Forces in Natural Seawater," published by ASTM International, West Conshohocken, PA, May 2003, pp. 1-5.

ASTM Document 5108, "Standard Test Method for Organotin Release Rates of Antifouling Coating Systems in Sea Water," published by ASTM International, West Conshohocken, PA, Feb. 1991, p. 1-6.

ASTM Document 5479, "Standard Practice for Testing Biofouling Resistance of Marine Coatings Partially Immersed," published by ASTM International, West Conshohocken, PA, May 1994, pp. 1-2.

ASTM Document 5589, "Standard Practice Test Method for Determining the Resistance of Paint Films and Related Coatings to Algal Defacement," published by ASTM International, West Conshohocken, PA, Sep. 1997, pp. 1-4.

ASTM Document 5590, "Standard Test Method for Determining the Resistance of Paint Films and Related Coatings to Fungal Defacement by Accelerated Four-Week Agar Plate Assay," published by ASTM International, West Conshohocken, PA, Feb. 2006, pp. 1-4.

ASTM Document 5618, "Standard Test Method for Measurement of Barnacle Adhesion Strength in Shear," published by ASTM International, West Conshohocken, PA, Sep. 2005, pp. 1-2.

Office Action mailed May 26, 2008 for Canadian Patent Application No. 2538124.

Office Action mailed Aug. 18, 2008 for Australian Patent Application No. 2003304222.

Search Report, Application No. GB0616715.9 dated Oct. 30, 2006.

Gayle et al., "Identification of Regions in Interleukin-1α Important for Activity," The Journal of Biological Chemistry, vol. 268, No. 29, Oct. 1993, pp. 22105-22111.

Whisstock et al., "Prediction of protein function from protein sequence and structure," Quarterly Reviews of Biophysics, vol. 36, No. 3, Aug. 2003, pp. 307-340.

Ausubel et al., Current Protocols in Molecular Biology, Chapter 16 entitled "Protein Expression," 1987.

Dumas et al., "Purification and Properties of the Phosphotriesterase from *Pseudomonas diminuta*," The Journal of Biological Chemistry, vol. 264, No. 33, Nov. 1989, pp. 19659-19665.

Dumas et al., "Inactivation of Organophosphorus Nerve Agents by the Phosphotriesterase from *Pseudomonas diminuta*," Archives of Biochemistry and Biophysics, vol. 277, No. 1, Feb. 1990, pp. 155-159.

Efremenko et al., "Addition of Polybrene improves stability of organophosphate hydrolase immobilized in poly(vinyl alcohol) cryogel carrier," J. Biochem. Biophys. Methods, vol. 51, 2002, pp. 195-201.

"Green Marine Paint," Chemical Week, Apr. 2001, p. 33.

Kim et al., "Enhanced-Rate Biodegradation of Organophosphate Neurotoxins by Immobilized Nongrowing Bacteria," Biotechnol. Prog., vol. 18, 2002, pp. 429-436.

Lei et al., "Entrapping Enzyme in a Functionalized Nanoporous Support," J. Am. Chem. Soc., vol. 124, 2002, pp. 11242-11243.

Munnecke, "Detoxification of Pesticides Using Soluble or Immobilised Enzymes," Process Biochemistry, Feb. 1978, pp. 14-16, 31.

Wu et al., "GFP-Visualized Immobilized Enzymes: Degradation of Paraoxon via Organophosphorus Hydrolase in a Packed Column," Biotechnology & Bioengineering, vol. 77, 2002, pp. 212-218.

Flick, Handbook of Paint Raw Materials, 2nd Ed., published by Noyes Publications, Aug. 1989, pp. 263-285.

Wicks et al., Organic Coatings, Science and Technology, vol. 1: Film Formation, Components, and Appearance, published by Wiley-Interscience, Oct. 1992, pp. 318-320.

Wicks et al., Organic Coatings, Science and Technology, vol. 2: Applications, Properties, and Performance, published by Wiley-Interscience, Nov. 1993, pp. 145, 309, 319-323, 340-341.

Albizo et al., "The Hydrolysis of GD and VX by Acetone Dried Preparations of Cured and Plasmid-Containing *Pseudomonas diminuta*," Chemical Research, Development & Engineering Center, Nov. 1986, pp. 643-649.

Mulchandani et al., "Biosensor for direct determination of organophosphate nerve agents. 1. Potentiometric enzyme electrode," Biosensors & Bioelectronics, vol. 14, 1999, pp. 77-85.

Mulchandani et al., "Fiber-optic enzyme biosensor for direct determination of organophosplate nerve agents," Biotechnology Progress, vol. 15, 1999, pp. 130-134.

Mulchandani et al., "Flow injection amperometric enzyme biosensor for direct determination of organophosphate nerve agents," Environmental Science Technology, vol. 35, 2001, pp. 2562-2565.

Singh et al., "Development of sensors for direct detection of organophosphates. Part I: immobilization, characterization and stabilization of acetylcholinesterase and organophosphate hydrolase on silica supports," Biosensors & Bioelectronics, vol. 14, 1999 pp. 703-713.

Rogers et al., "Organophosphorus hydrolase-based assay for organophosphate pesticides," Biotechnology Progress, vol. 15, 1999, pp. 517-521.

Gaberlein et al., "Disposable potentiometric enzyme sensor for direct determination of organophosphorus insecticides," Analyst, vol. 125, No. 12, 2000, pp. 2274-2279.

Wang et al., "Orientation specific immobilization of organophosphorus hydrolase on magnetic particles through gene fusion," Biomacromolecules, vol. 2, 2001, pp. 700-705.

Caldwell et al., "Detoxification of Organophostphate Pesticides Using a Nylon Based Immobilized Phosphotriesterase From *Pseudomonas diminuta*," Applied Biochemistry & Biotechnology, vol. 37, 1991, pp. 103-109.

Lejeune et al., "Biocatalytic nerve agent detoxification in fire fighting foams. Biotechnology & Bioengineering," vol. 62, No. 6, 1999, pp. 659-665.

Office Action Mailed Jan. 12, 2006 for U.S. Appl. No. 10/655,345.

Final Office Action Mailed Feb. 27, 2008 for U.S. Appl. No. 10/655,345.

Office Action Mailed Mar. 27, 2009 for U.S. Appl. No. 10/655,345.

Sakuradani et al., "Identification of Δ2-fatty acid desaturase from arachidonic acid-producing *Mortierella* fungus by heterologous expression in the yeast *Saccharomyces cerevisiae* and the fungus *Aspergillus oryzae*," Eur. J. Biochem., vol. 261, 1999, pp. 812-820.

Grimsley et al., "Structural and mutational studies of organophosphorus hydrolase reveal a cryptic and functional allostericbinding site," Arch. Biochem. Biophys., vol. 442, No. 2, 2005, pp. 169-179.

Yang et al., "Evolution of an organophosphate-degrading enzyme: a comparison of natural and directed evolution," Protein Eng., vol. 16, No. 2, 2003, pp. 135-145.

Newcomb et al., "A single amino acid substitution converts a carboxylesterase to an organophosphorus hydrolase and confers insecticide resistance on a blowfly," Proc. Natl. Acad. Sci. USA, vol. 94, No. 14, 1997, pp. 7464-7468.

Mulbry et al., "Parathion hydrolase specified by the *Flavobacterium* opd gene: relationship between the gene and protein," J. Bacteriol., vol. 171, No. 12, 1989, pp. 6740-6746.

Office Action Mailed Jun. 28, 2007 for U.S. Appl. No. 10/792,516.

Office Action Mailed May 13, 2009 for U.S. Appl. No. 10/792,516.

Paint and Surface Coatings, Theory and Practice, 2nd Ed., © 1999 Woodhead Publishing Ltd., pp. 2, 3, 10, 24, 51, 162, 193, 194, 371-383, 397, 448, 494-497, 533, 541-547, 700.

Drevon et al., "High-Activity Enzyme-Polyurethane Coatings," Biotechnology & Bioengineering, vol. 79, No. 7, 2002, pp. 785-794.

Handbook of Coatings Additives, © 1987 Marcel Dekker, Inc., pp. 43-63 and 177-224.

Paints, Coatings and Solvents, Second Completely Revised Edition, Edited by Stoye and Freitag, © Wiley-VCH 1998, pp. 6, 12-19, 127, 165, 288-290.

Karsa et al., Waterborne Coatings and Additives, © 1995, pp. 202-216, 243-251. 1995.

Rainina et al., "The development of a new biosensor based on recombinant *E. coli* for the direct detection of organophosphorus neurotoxins," Biosensors & Bloelectronics, vol. 11, No. 10, 1996, pp. 991-1000.

Gaberlein et al., "Microbial and cytoplasmic membrane-based potentiometric biosensors for direct determination organophosphorus insecticides," Applied Microbiology and biotechnology, vol. 54, No. 5, 2000, pp. 652-658.

Mulchandani et al., "A potentiometric microbial biosensor for direct determination of organophosphate nerve agents," Electroanalysis, vol. 10, No. 11, 1998, pp. 733-737.

Mulchandani et al., "Biosensor for direct determination of organophosphate nerve agents using recombinant *Escherichia coli* with surface-expressed organophosphorus hydrolase. 1. Potentiometric microbial electrode," Analytical Chemistry, vol. 70, No. 19, 1998, pp. 4140-4145.

Mulchandani et al., "Biosensor for direct determination of organophosphate nerve agents using recombinant *Escherichia coli* with surface-expressed organophosphorus hydrolase. 2. Fiber optic microbial biosensor," Analytical Chemistry, vol. 70, 1998, pp. 5042-5046.

Mulchandani et al., "Amperometric microbial biosensor for direct determination of organophosphate pesticides using recombinant microorganism with surface expressed' organophosphorus hydrolase," Biosensors and Bloelectronics, vol. 16, 2001, pp. 433-437.

Wang et al., "Specific adhesion to cellulose and hydrolysis of organophosphate nerve agents by a genetically engineered *Escherichia coli* strain with a surface-expressed cellulose-binding domain and organophosphorus hydrolase," Applied & Environmental Microbiology, vol. 68, No. 4, 2002, pp. 1684-1689.

Hong et al., "Neurotoxic Organophosphate Degradation with Polyvinyl Alcohol Gel-Immobilized Microbial Cells," Bioremediation Journal, vol. 2, No. 2, 1998, pp. 145-157.

Mulchandani et al., "Detoxification of organophosphate nerve agents by immobilized *Escherichia coli* with surface-expressed organophosphorus hydrolase," Biotechnology Bioengineering, vol. 63, No. 2, 1999, pp. 216-223.

Lejeune et al., "Covalent binding of a nerve agent hydrolyzing enzyme within polyurethane foams," Biotechnology and Bioengineering, vol. 51, No. 4, 1996, pp. 450-457.

Lejeune et al., "Dramatically stabilized phosphotriesterase-polymers for nerve agent degradation," Biotechnology and Bioengineering, vol. 54, No. 2, 1997, pp. 105-114.

Lejeune et al., "Increasing the Tolerance of Organophosphorus Hydrolase to Bleach," Biotechnology and Bioengineering, vol. 64, No. 2, 1999, pp. 250-254.

Havens et al., "Reusable Immobilized Enzyme/Polyurethane Sponge for Removal and Detoxification of Localized Organophosphate Pesticide Spills," md. Eng. Chem. Res., vol. 32, 1993, pp. 2254-2258.

Gordon et al., "Organophosphate Skin decontamination using immobilized enzymes," Chemico Biologica Interactions, vol. 119-120, 1999, pp. 463-470.

Munnecke et al., "Hydrolysis of Organophosphate Insecticides by an Immobilized-Enzyme System," Biotechnology Bioengineering, vol. 21, 1979, pp. 2247-2261.

Mulchandani et al., "Biosensors for direct determination of organophosphate pesticides," Biosensors & Bioelectronics, vol. 16, 2001, pp. 225-230.

Lejeune et al., "Nerve agents degraded by enzymatic foams," Nature, vol. 395, No. 6697, 1998, pp. 27-28.

Komives et al., "Degradation of pesticides in a continuous-flow two-phase microemulsion reactor," Biotechnology, vol. 10, 1994, pp. 340-343.

Pei et al., "Encapsulation of Phosphotriesterase Within Murine Erythrocytes. Toxicology and Applied Pharmacology," vol. 124, 1994, pp. 296-301.

Petrikovics et al., "Antagonism of paraoxon intoxication by recombinant phosphotriesterase encapsulated within sterically stabilized liposomes," Toxicology & Applied Pharmacology, vol. 156, 1999, pp. 56-63.

Yang et al., "Nonaqueous biocatalytic degradation of a nerve gas mimic," Biotechnology, vol. 11, 1995, pp. 471-474.

Andreopoulos et al., Photoimmobilization of organophosphorus hydrolase within a PEG-based hydrogel, Biotechnology Bioengineering, vol. 65, No. 5, 1999, pp. 579-588.

Cheng et al., "Alteromonas prolidase for organophosphorus G-agent decontamination," Chemico-Biological Interactions, vols. 119-120, 1999, pp. 455-462.

McGuinn et al., The Encapsulation of Squid Diisopropylphosphorofluoridate-Hydrolizing Enzyme within Mouse Erythrocytes, Fundamental and Applied Toxicology, vol. 21, 1993, pp. 38-43.

Hoskin et al., "Hydrolysis of Nerve Gas by Squid-Type Diisopropyl Phosphorofluoridate Hydrolyzing Enzyme on Agarose Resin," Science, vol. 215, 1982, pp. 1255-1257.

Drevon et al., "Irreversible Immobilization of Diisopropylfluorophosphatase in Polyurethane Polymers," Biomacromolecules, vol. 1, 2000, pp. 571-576.

Drevon et al., "Thermoinactivation of Diisopropylfluorophosphatase Containing Polyurethane Polymers," Biomacromolecules, vol. 2, 2001, pp. 664-671.

McDaniel et al., "Cloning and sequencing of a plasmid-borne gene (opd) encoding a phosphotriesterase," J. of Bacteriology, vol. 170, No. 5, 198, pp. 2306-2311.

Lewis et al., "Mechanism and stereochemical course at phosphorus of the reaction catalyzed by a bacterial phosphotriesterase," Biochemistry, vol. 27, 1988, pp. 1591-1597.

Richins et al., "Expression, immobilization, and enzymatic characterization of cellulose-binding domain-organophosphorus hydrolase fusion enzymes," Biotechnology & Bioengineering, vol. 69, No. 6, 2000, pp. 591-596.

Chen et al., "Combinatorial screening for enzyme-mediated coupling. Tyrosinase-catalzyed coupling to create protein-chitosan conjugates," Biomacromolecules, 2001, pp. 456-462.

Shimazu et al., "Thermally triggered purification and immobilization of elastin-OPH fusions," Biotechnology & Bioengineering, vol. 81, No. 1, 2003, pp. 75-79.

Chen et al., "The use of live biocatalysts for pesticide detoxification," Trends in Biotechnology, vol. 16, 1998, pp. 71-76.

Lejeune et al., "Fighting nerve agent chemical weapons with enzyme technology," Annals New York Academy of Sciences, vol. 864, 1998, pp. 153-170.

Petrikovics et al., "In vitro studies on sterically stabilized liposomes (SL) as enzyme carriers in organophosphorus (OP) antagonism," Drug Delivery, vol. 7, 2000, pp. 83-89.

Jamieson, "New Perspectives on Seed Enhancement," Acta Hort., vol. 782, ISHS 2008, pp. 143-150.

Johnson, "Germination," Seed Development, Copyright 2003 by Elsevier Ltd., pp. 1298-1304.

Scott, "Seed Coatings and Treatments and Their Effects on Plant Establishment," Advances in Agronomy, vol. 42, Copyright 1989 by Academic Press, Inc., pp. 43-83.

Taylor et al., "Concepts and Technologies of Selected Seed Treatments," Annu. Rev. Phytopathol., Copyright 1990 by Annual Reviews Inc., pp. 321-339.

Taylor, "Seed Treatments," Seed Development, Copyright 2003 by Elsevier Ltd., pp. 1291-1298.

\* cited by examiner

EQUIPMENT DECONTAMINATION SYSTEM AND METHOD

PRIORITY CLAIM

The present application claims the benefit of U.S. Provisional Application No. 61/139,802 filed Dec. 22, 2008.

BACKGROUND OF THE INVENTION

1. Field of the Invention

The invention relates generally to systems and processes for the decontamination of chemical or biological agents from objects, such as vehicles and other equipment.

2. Description of the Related Art

Organophosphorus compounds ("organophosphate compounds" or "OP compounds") and organosulfur ("OS") compounds are used extensively as insecticides and are highly toxic to many organisms, including humans. OP compounds function as nerve agents. The primary effects of exposure to these agents are very similar, including inhibition of acetylcholinesterase and butyrylcholinesterase, with the subsequent breakdown of the normal operation of the autonomic and central nervous systems.

Some of the most toxic OP compounds are used as chemical warfare agents ("CWA"). Chemical warfare agents are classified into G agents, such as GD ("soman"), GB ("sarin"), GF ("cyclosarin") and GA ("tabun"), and the methyl phosphonothioates, commonly known as V agents, such as VX and Russian VX ("R-VX" or "VR"). All CWAs are colorless liquids with volatility varying from VX to sarin. VX is an involatile oil-like liquid, while sarin is a water-like, easily volatilized liquid. Such agents enter the body through any of the following manners: inhalation, direct contact to the skin with a gas or with a contaminated surface, or through ingestion of contaminated food or drink. Surfaces that are exposed to the gas retain their toxicity for long periods of time, such as days or weeks, and indefinitely under some environmental conditions. By addition of a thickener (e.g., a variety of carbon polymers), soman or other more volatile agents may be made to be less volatile and more persistent.

SUMMARY OF THE INVENTION

In general, the present invention features a decontamination system for an object, comprising: a supply of a decontamination fluid, the decontamination fluid comprising: a liquid carrier; and a decontaminating chemical additive mixed with the liquid carrier, the decontaminating chemical additive comprising an organophosphorus compound-degrading enzyme; and a liquid applicator operatively associated to the supply of the decontamination fluid, wherein the liquid applicator applies the decontamination fluid to the object to be decontaminated.

In some embodiments, the decontamination system further comprises: a decontamination fluid flow control system for conveying the decontamination fluid from the supply of the decontamination fluid to the liquid applicator. In certain aspects, the decontamination fluid flow control system comprises: a liquid temperature controller that receives the decontamination fluid from the supply of the decontamination fluid and maintains the decontamination fluid at a temperature suitable for activity of the decontaminating chemical additive; a fluid conduit that flows the decontamination fluid from the liquid temperature controller to the liquid applicator; and a pump operative associated with at least one of the fluid conduit, the liquid temperature controller, the supply of the decontamination fluid, and the liquid applicator, wherein the pump provides impetus to flow the decontamination fluid through the decontamination fluid flow control system. In some aspects, the decontamination fluid flow control system comprises: a recirculation system for recovering decontamination fluid for re-use after application by the liquid applicator.

In certain facets, the recirculation system comprises: a liquid collector that collects the decontamination fluid after application by the liquid applicator; a fluid conduit that conveys the collected decontamination fluid from the liquid collector; a decontamination reactor that, receives the collected decontamination fluid, and detoxifies a contaminant in the collected decontamination fluid; an analyzer operably associated with the detoxified decontaminated fluid to determine a level of residual contamination in the detoxified decontaminated fluid; a waste container for decontamination fluid; a fluid flow control device to selectively direct the detoxified decontaminated fluid to at least one of the liquid applicator and the waste container; a fluid conduit for conveying the detoxified decontamination fluid to at least one of the liquid applicator and the waste container; and a pump operative associated with at least one of the liquid collector, the fluid conduit that conveys the collected decontamination fluid from the liquid collector, the decontamination reactor, the analyzer, the fluid flow control device, and the fluid conduit for conveying the detoxified decontamination fluid, wherein the pump provides impetus to flow decontamination fluid through the recirculation system.

In specific facets, the decontamination reactor comprises: a reaction chamber; an inlet for transmitting decontamination fluid into the reaction chamber; a support component (e.g. wire mesh, alumina spheres, ceramic rings, etc.) within the reactor chamber as a carrier of the decontaminating chemical additive, capable of detoxifying a contaminant in the decontamination fluid; and an outlet for transmitting the detoxified decontamination fluid from the reaction chamber. In other facets, the recirculation system further comprises: a separator for removing solids from decontamination fluid, the separator operatively associated with at least one of the liquid collector, the fluid conduit that conveys the collected decontamination fluid from the liquid collector, the decontamination reactor, the analyzer, the fluid flow control device, the fluid conduit for conveying the detoxified decontamination fluid, and the pump.

In certain embodiments, the decontamination system for an object further comprises: a liquid sprayer frame for supporting the liquid applicator in a position to allow the liquid applicator to apply the decontamination fluid onto the object to be decontaminated. In some aspects, the liquid sprayer frame comprises: at least four vertical support legs positioned to allow the object to be between at least two of the vertical support legs; at least four connecting devices, each of which is attached to a different vertical support leg; at least four horizontal brace members, the ends of each horizontal brace member being attached to the connecting devices to form a generally rectangular shape by the horizontal brace members; at least one movable connecting device attached to each different vertical support leg; at least two side rails, each end of each side rail attached to a different movable connecting device that is attached to a vertical support leg; at least one movable connecting device attached to each different side rail; at least one cross-member, each end of the cross member attached to a different movable connection device attached to a side rail; and a movable connecting device interconnecting the liquid applicator to at least one of the cross member and the side rail; the movement of the movable connecting device attached to a vertical support leg, the movable connecting device attached to a side rail, the movable connecting device interconnecting the liquid applicator, or a combination thereof, positioning the liquid applicator to apply the decontamination fluid onto the object to be decontaminated.

In certain embodiments, the decontamination system for an object further comprises: a chamber to at least partially enclose the object to be decontaminated. In other embodiments, the fluid control system comprises at least one fluid level controller. In some embodiments, the decontaminating chemical additive further comprises another enzyme, a coenzyme, an enzyme activator, a cellular material, an antibody, a salt, a pH buffer, an antibiological agent, a reaction detection agent, a caustic agent, or a combination thereof. In some aspects, the decontamination fluid comprises a fire fighting foam.

Some embodiments provide a decontamination system for an object, comprising: a supply of a decontamination fluid, the decontamination fluid comprising: a liquid carrier; a decontaminating chemical additive mixed with the liquid carrier, the decontaminating chemical additive comprising an organophosphorus compound-degrading enzyme; a plurality of spray nozzles operatively associated to the supply of the decontamination fluid, wherein one or more of the spray nozzles applies the decontamination fluid to the object to be decontaminated; a liquid sprayer frame for supporting one or more spray nozzles in a position to allow at least one spray nozzles to apply the decontamination fluid onto the object to be decontaminated; and a decontamination fluid flow control system for conveying the decontamination fluid to one or more of the spray nozzles, wherein the decontamination fluid flow control system comprises: a recirculation system for recovering decontamination fluid for re-use after application by at least one of the spray nozzles, wherein the recirculation system comprises: a decontamination reactor for removing a contaminant from the decontamination fluid. In some aspects, the decontaminating chemical additive further comprises another enzyme, a coenzyme, an enzyme activator, a cellular material, an antibody, a salt, a pH buffer, an antibiological agent, a reaction detection agent, a caustic agent, or a combination thereof. In certain facets, the decontamination fluid comprises a fire fighting foam.

Other embodiments provide a method of decontaminating an object contaminated with an organophosphorus compound, comprising: obtaining an object contaminated with an organophosphorus compound; and applying a decontamination fluid to the object, the decontamination fluid comprising: a liquid carrier; and a decontaminating chemical additive mixed with the liquid carrier, the decontaminating chemical additive comprising an organophosphorus compound-degrading enzyme. In some aspects, the method of decontaminating an object further comprises: collecting the decontamination fluid after application; removing organophosphorus contamination from the decontamination fluid; and applying the decontamination to an object to decontaminate the object; wherein the object may be the same or different object than the object that the decontamination fluid was previously applied. In some facets, removing organophosphorus contamination from the decontamination fluid comprises: flowing the decontamination fluid through a decontaminating reactor having a support component (e.g. wire mesh, alumina spheres, ceramic rings, etc.) within the reactor chamber as a carrier of the decontaminating chemical additive, capable of detoxifying an organophosphorus compound from the decontamination fluid. In other facets, the decontamination fluid further comprises another enzyme, a coenzyme, an enzyme activator, a cellular material, an antibody, a salt, a pH buffer, an antibiological agent, a reaction detection agent, a caustic agent, or a combination thereof.

DETAILED DESCRIPTION OF THE EMBODIMENTS

Figure 1:
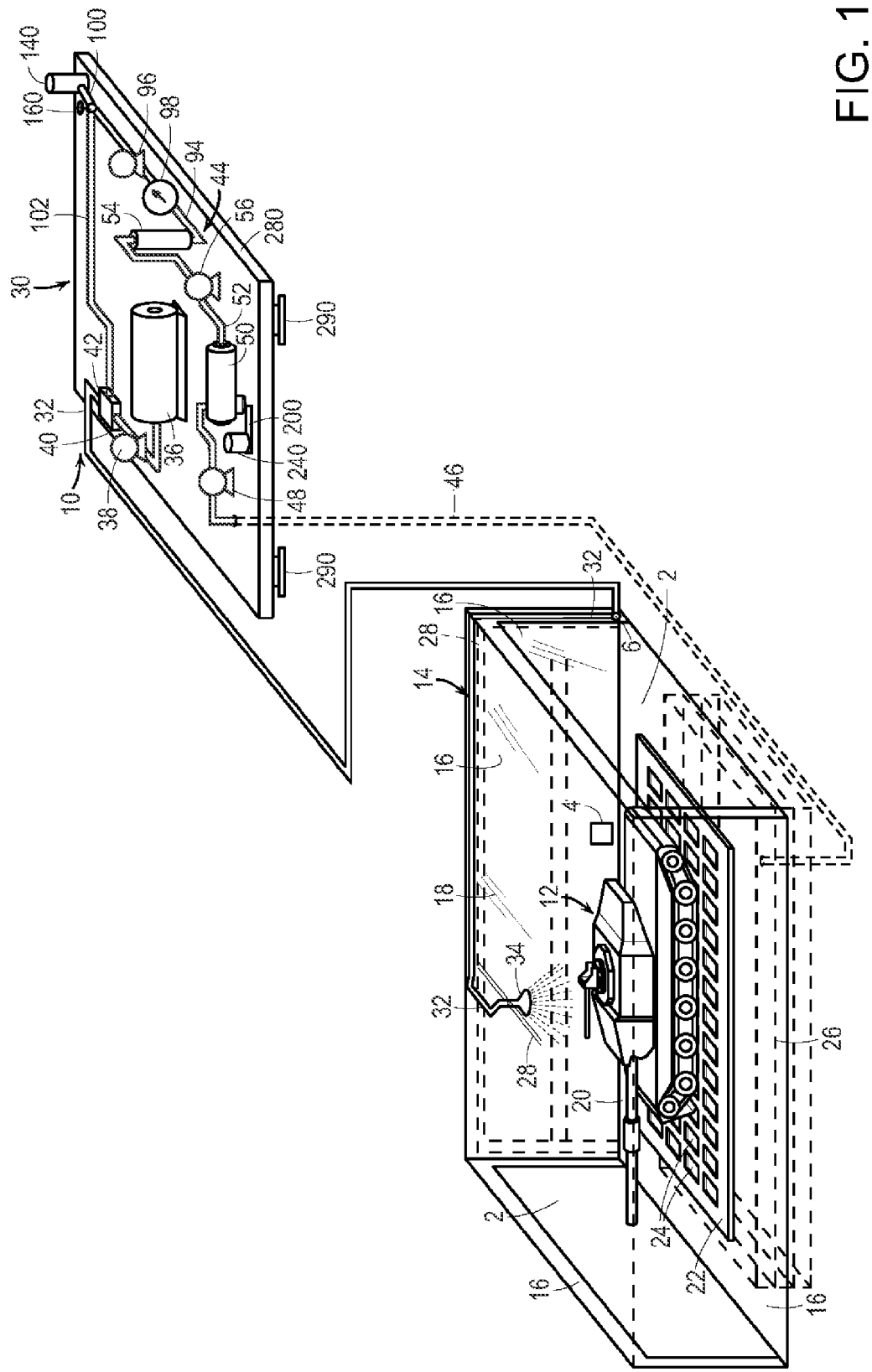
FIG. 1 illustrates an exemplary decontamination system, including exemplary decontamination fluid flow control and recirculation systems.

For further understanding of the embodiments of the invention, reference is made to the following detailed description, taken in conjunction with the accompanying drawing(s) in which reference character(s) designate like or similar element(s) throughout the several figures of the drawing(s). It will appreciated that various adaptation(s), change(s), equivalent(s), modification(s), substitution(s), deletion(s), and/or addition(s) of material(s), procedure(s) and/or protocol(s) may be made without departing from the spirit and scope of the invention. It is to be understood, however, that the present invention may be embodied in various form(s). Therefore, specific detail(s) disclosed herein are not to be interpreted as limiting, but rather as a basis for the claim(s) and as a representative basis for teaching the embodiment(s) in virtually any appropriately detailed system, composition, structure or manner.

As used herein other than the claims, the terms "a," "an," "the," and/or "said" means one or more. As used herein in the claim(s), when used in conjunction with the word(s) "comprise," "comprises" and/or "comprising," the word(s) "a," "an," "the," and/or "said" may mean one or more than one. As used herein and in the claim(s), the terms "having," "has," "is," "have," "including," "includes," and/or "include" has the same meaning as "comprising," "comprises," and "comprise." As used herein and in the claims "another" may mean at least a second or more. As used herein and in the claim(s), "about" refers to any inherent measurement error or a rounding of digit(s) for a value (e.g., a measured value, calculated value such as a ratio), and thus the term "about" may be used with any value and/or range. The phrase "a combination thereof" "a mixture thereof" and such like following a listing, the use of "and/or" as part of a listing, a listing in a table, the use of "etc" as part of a listing, the phrase "such as," and/or a listing within brackets with "e.g.," or "i.e.," refers to any combination (e.g., any sub-set) of a set of listed component(s), and combination(s) and/or mixture(s) of related specie(s) and/or embodiment(s) described herein though not directly placed in such a listing are also contemplated. For example, component(s) such as different types of valve(s) described in different section(s) of the specification may be claimed individually and/or as a combination, as they are part of the same genera. Such related and/or like genera(s), sub-genera(s), specie(s), and/or embodiment(s) described herein are contemplated both in the form of an individual component that may be claimed, as well as a mixture and/or a combination that may be described in the claim(s) as "at least one selected from," "a mixture thereof" and/or "a combination thereof" Additionally, terms such as "such as" and/or "e.g.," generally refer to non-limiting example(s).

All patents and publications mentioned in this specification are herein incorporated by reference to the same extent as if each individual patent or publication was specifically and individually indicated to be incorporated by reference.

System(s) and method(s) are described herein for decontaminating an object (e.g., a piece of equipment) that may have been contaminated with an undesired chemical and/or biological agent. In typically operation, a decontamination fluid is applied to the object by a decontamination system comprising a liquid applicator (e.g., a spray nozzle) operatively associated with a supply of the decontamination fluid. In many embodiments, rinsing may not occur. Often the decontamination system comprises a chamber enclosing the object, and upon completion of washing, the object may be removed from the chamber.

Use of a decontamination fluid comprising an enzyme-based (e.g., a phosphoric triester hydrolase, $OPD_{tox}$™, a lipolytic enzyme, DeGreez™) and/or peptide based (e.g., ProteCoat®) decontaminating chemical additive may decontaminate a wide range of OP compound(s), lipid(s), and/or biological agent(s). The decontamination chemical additives $OPD_{tox}$™, DeGreez™, and ProteCoat® are available commercially from Reactive Surfaces, Ltd., 300 West Avenue Suite 1316, Austin, Tex., USA. Examples of organophosphorus compound(s) that may be decontaminated include a CWA nerve agent (e.g., VX, GD, GB, tabun) and/or a pesticide. The decontamination chemical additive(s) initiate the decon process upon contact with the contaminants.

The decontamination system may include a decontamination fluid flow control system that helps ensure delivery of decontamination fluid to the liquid applicator(s). The decontamination fluid flow control system may include a number of fluid pump(s) and/or fluid conduit(s). In addition, the decontamination fluid flow control system may feature a recirculation system that collects decontamination fluid runoff, such as decontamination fluid draining from the object after application. The collected decontamination fluid may be transported to a decontamination reactor. The decontamination reactor further reduces and/or destroys any remaining contaminant(s) (e.g., CWAs) from the collected decontamination fluid. The decontamination reactor design(s) disclosed herein may be modified to operate on a continuous basis and may include other unit operations associated with the treatment of fluid(s), such as decontamination a biological agent, decontamination of another chemical besides an OP compound, etc.

The treated decontamination fluid may be transferred from the decontamination reactor to be reused for further decontamination.

In many embodiments, the recirculation system also features a separator for removing solids from the collected decontamination fluid. The recirculation system may also include an analyzer placed downstream of the decontamination reactor to determine the level of residual contamination remaining in the decontamination fluid exiting the reactor. Determining the level of residual contamination allows contaminated decontamination fluid to be routed to waste while acceptably decontaminated decontamination fluid may return to the active liquid applicator(s) (e.g., decontamination nozzles). The decontamination system's use of recirculation and treatment of the decontamination fluid runoff may result in reduced waste product(s) to be handled following the decontamination process for one or more object(s).

The decontamination system(s) and technique(s) described herein may be used on a standalone basis or combined with other decontamination efforts. Also, it is expected that decontamination system(s), decontamination fluid flow control system(s), recirculation system(s), decontamination reactor system(s), other fluid handling system(s) and technique(s) disclosed herein can be scaled-up to handle fluid treatment on an industrial scale for various purposes.

Figure ("FIG.") 1 depicts an exemplary decontamination system 10 being used to decontaminate an object 12 (e.g., equipment, a vehicle). Although an armored vehicle is depicted as the object 12, this is merely an example and other object(s) may be decontaminated that have been contaminated and/or are suspected of being contaminated.

The decontamination system 10 may include a chamber 14 enclosed by a wall 16 (e.g., a plurality of walls, a circular wall) and/or a ceiling 18, with four walls and ceiling visibly depicted. The wall(s) 16 and/or ceiling 18 may be of solid and/or flexible (e.g., plastic curtain, canvas, etc.) material, and may form a fully enclosed or partly enclosed chamber 14. For example, if the decontamination system 10 is located in a field environment, the chamber 14 may be formed by a suitable portable tent enclosure of a type known in the art. In certain embodiments the chamber 14 may be constructed around the object 12 to be decontaminated, and disassembled after decontamination of the object 12. Entry(s) 2 (e.g., a door, an opening in a wall, a lack of a wall) may be provided to permit the entrance and/or departure of the object 12. An object 12 may enter and exit the chamber 14 through the same entry 2 or different entries 2. For example, an object 12 (e.g., a vehicle) may move through the chamber 14 in a generally linear fashion via entries 2 that generally face opposite each other on different walls 16 of the chamber 14. The chamber 14 may include window(s) 4 to allow an operator to monitor the component(s) of the decontamination system 10 and/or the object 12 in the chamber 14, such as during operation.

Suitable opening(s) 6 in the wall(s) 16 and/or ceiling 18 may be present to allow decontamination system 10 component(s), such as fluid conduit(s) 32 [e.g., pipe(s), flow line(s), flow tube(s), hose(s), etc.] to span from the inside of the chamber 14 to outside the chamber 14. The interior of the chamber 14 may contain liquid applicator(s) 34, depicted as a spray nozzle. The liquid applicator 34 is operatively associated, often via the fluid conduit(s) 32, with a supply of the decontamination fluid 36, depicted as a decontamination fluid supply tank 36, from which decontamination fluid flows to the liquid applicator 34 to be applied (e.g., sprayed) onto the object 12. The liquid applicator 34 may be attached to a liquid sprayer frame 28, the details described herein. The floor 20 beneath the object 12 may include a liquid collector 26 that collects decontamination fluid runoff, such as decontamination fluid that drains off of the object 12 upon application of the decontamination fluid by the liquid applicator 34. The floor 20 may also comprise drainage 22 (e.g., a grate, an inclination in the floor) to guide the decontamination fluid runoff to the liquid collector 26. The liquid collector 26 may be in various forms known in the art, including a sump; a drain pan; a fluid-impermeable tarp that is spread out underneath the object 12; a channel adjacent to the floor 20, wherein the floor 20 is inclined so to allow decontamination fluid runoff to drain into the channel; or a combination thereof. Depicted is a drainage 22 in the form of a grate having opening(s) 24 to permit the passage of decontamination fluid runoff through the floor 20 and into the liquid collector 26 (e.g., a sump).

As exemplarily depicted in FIG. 1, the decontamination system 10 may be operated to decontaminate the object 12 in the following manner. The object 12 would be moved into the chamber 14 so that the object 12 is positioned over the grate 22. The decontamination fluid flow control system 30 is then operated to supply decontamination fluid to the liquid applicator 34, thereby washing the object 12 with the decontamination fluid. In many embodiments, no rinsing is conducted, or rinsing may be purposefully conducted only after a period of time (e.g., about 1 second to about 1 month). By letting decontamination fluid remain upon the object, the decontamination effect may be enhanced in some instances, such as allowing a period to time for the decontaminating chemical additive within the decontamination fluid to decontaminate contaminants on the object 12.

The liquid applicator 34 may be of any type known in the art, such as, for example, a spray nozzle, a water jet, a brush, or a combination thereof. In many embodiments, a liquid applicator 34 (e.g., a spray nozzle) is capable of using a decontamination fluid comprising a particulate and/or a solid material such as a microorganism (e.g., a bacterium), silt, dust, dirt, or a combination thereof. A particulate material may be purposely included in the decontamination fluid, such as in the case of a biological cell-based (e.g., a microorganism-based) particulate material comprising a decontaminating enzyme, and/or may be an undesired material, such as a rock, sand, silt, dust, dirt, etc., such as an undesired material that was washed from the object 12. The undesired material may be collected in separator 50 for disposal, such as via a conduit 200 in some embodiments. The types of liquid applicator(s) 34 that may be used include those designed to spray a fluid in high volume and at high velocity, even in the presence of high concentration particulate suspension(s) in the fluid, as would be known in the art. For example, spray nozzle(s) have been used in apparatuses in air purification for textile, ginning, and other industrial setting(s) where a large amount of particulate matter is resident in the ambient air, and such spray nozzle(s) may be adapted for use as liquid applicator(s) 34. An example spray nozzle is a Pneumafil (Luwa) nozzle (part number A26516B1) available commercially from Pneumafil Corporation 4433 Chesapeake Dr., Charlotte, N.C.

Figure 2:
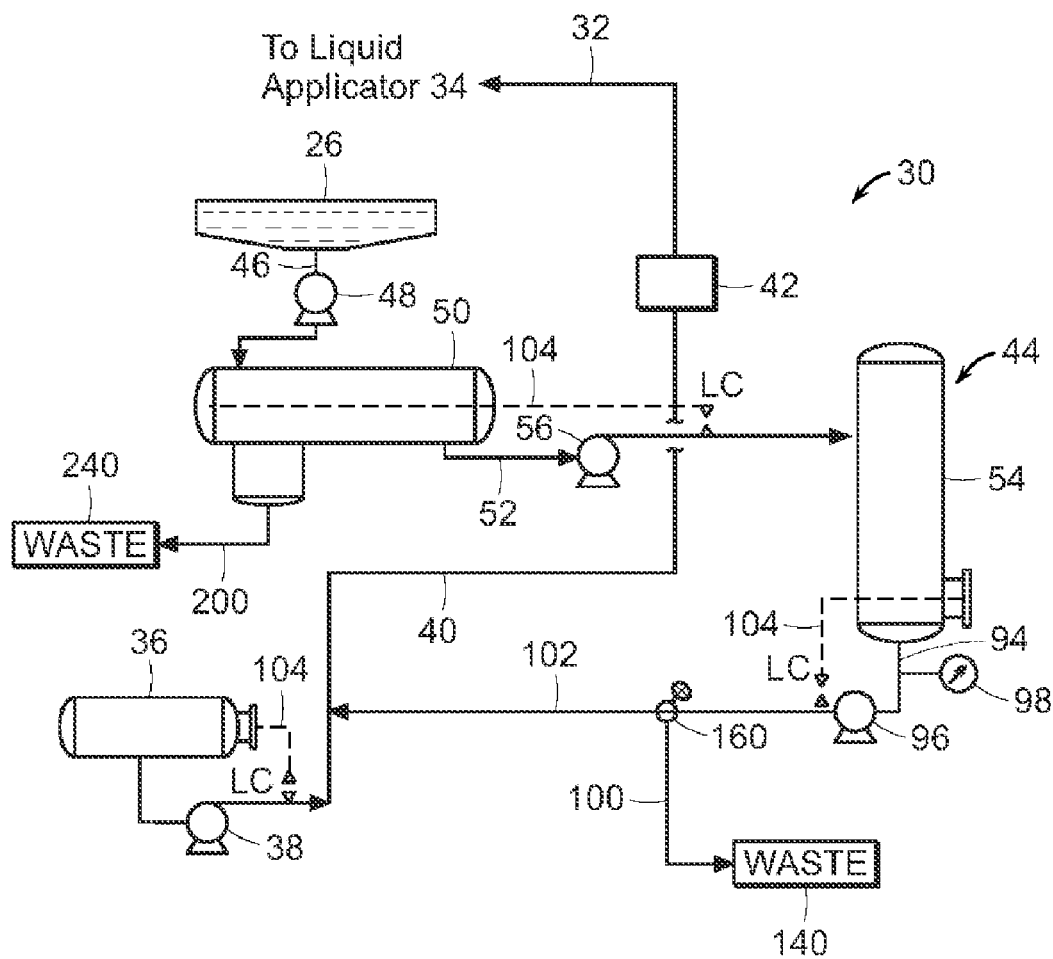
FIG. 2 is a schematic diagram depicting exemplary features of operation of the decontamination system, including exemplary features of a decontamination fluid flow control system and a recirculation system, shown in FIG. 1.

The decontamination system 10 may include a decontamination fluid flow control system 30 shown at FIG. 1, which is also depicted schematically in FIG. 2. The decontamination fluid flow control system 30 is operably associated with the supply of the decontamination fluid 36 and/or the fluid conduit(s) 32 that feeds the decontamination fluid to the liquid applicator(s) 34. (FIG. 1). The decontamination fluid flow control system 30 (FIGS. 1 and 2) may include a fluid pump 38 that provides impetus for conveying the decontamination fluid from the decontamination fluid supply 36. In some embodiments, the decontamination fluid may flow in a fluid conduit 40 to a liquid temperature controller 42 (e.g., a heater, a cooler) of a type known in the art. The decontamination fluid may flow from the liquid temperature controller 42 via fluid conduit(s) 32 to the liquid applicator(s) 34. The liquid temperature controller 42 may be actuated to maintain the decontamination fluid at a suitable temperature so that the decontaminating chemical additive within the decontamination fluid can be active as desired, such as fastest decontamination rate upon contact with the object 12 (e.g., generally a higher temperature suitable for the decontaminating chemical additive) and/or greatest decontamination longevity after recirculation and reuse (e.g., generally a lower temperature suitable for the decontaminating chemical additive), etc.

In some embodiments, the supply of the decontamination fluid 36 may be temperature controlled, and the liquid temperature controller 42 is an optional component. In other embodiments, the decontamination system 10 may include both a temperature controlled supply of the decontamination fluid 36, such as to maintain the decontamination fluid at a temperature (e.g., a cooler temperature) that increases the useful lifetime of the decontaminating chemical additive, and a liquid temperature controller 42 that maintains a portion of the decontamination fluid (e.g., a portion soon to be dispersed onto the object 12) at a temperature (e.g., a warmer temperature) suitable for increased activity of the decontaminating chemical additive. For example, where the decontaminating chemical additive within the decontamination fluid comprises $OPD_{tox}$™, the temperature of the decontamination fluid should be maintained at a minimum of about 21° C. and a maximum of about 85° C.

The decontamination fluid flow control system 30 may also includes a recirculation system, generally indicated at 44 (FIGS. 1 and 2), which obtains used decontamination fluid recovered in the liquid collector 26, and permits the decontamination fluid to be to be recirculated for reuse in further decontamination of one or more object(s) 12. The presence of the recirculation system 44 may allow for the catalytic nature of the decontaminating chemical additive(s) to conduct additional decontamination; thus, resulting in a reduced supply of decontamination fluid to be used to decontaminate the object(s) 12. In addition, there may be a reduced amount of contaminated waste to contend with upon completion of the decontamination operation. The recirculation system may also remove contamination such as solids, a chemical (e.g., an OP compound), a biological agent (e.g., an undesired living cell, an undesired virus) or a combination thereof, from the collected decontamination fluid. In some embodiments, the recirculation system 44 includes a fluid conduit 46 operably associated with the liquid collector 26 to convey collected decontamination fluid, typically under impetus of a fluid pump 48. The collected decontamination fluid is conveyed to another component of the recirculation system, such as a separator 50 of a type known in the art for separating solids (e.g., dirt, pebble(s)/rock(s), silt, dust, etc) from a fluid and/or a decontamination reactor 54 for further decontamination of chemical and/or biological contaminants.

For example, FIG. 2 shows fluid conduit 46 being operatively connected to separator 50. The separator 50 may include, for example, a gravity-type separator, a centrifugal-type separator, include a filter, include a screen, include a strainer, or a combination thereof, to remove solids from the decontamination fluid that enters the separator 50. The collected solids may be contained and/or disposed of in any manner known in the art for handling and/or disposal of toxic contaminated waste solids, such as indicated by the arrow 200, which may represent a conduit in some embodiments, leading to a separate solid waste disposal container 240 that the solid waste may be transferred to for appropriate disposal (FIG. 2). Contaminated solids that are byproducts of the decontamination system 10 may be less hazardous and toxic than those decontaminated using conventional methods, and may be handled and/or disposed of accordingly for waste of the resultant level of toxicity after processing through the decontamination system 10.

In many embodiments, after separation from the solids, the decontamination fluid may flow out of the separator 50 through fluid conduit(s) 52 into a decontamination reactor 54, often under the impetus of a fluid pump, such as the depicted fluid pump 56. The decontamination fluid may be recycled through the decontamination reactor 54 to provide for additional detoxification of the decontamination fluid. The decontamination reactor 54 typically may be used for detoxifying a fluid contaminated with an organophosphorus compound. Exemplary decontamination reactor(s) 54 are described further with reference to FIGS. 3-6.

Figure 3:
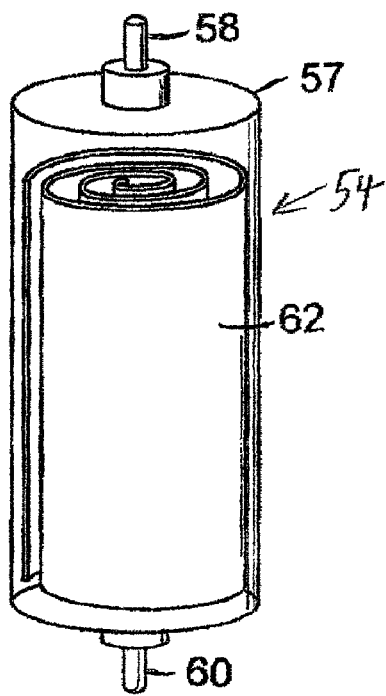
FIG. 3 depicts an exemplary decontamination reactor used with the decontamination system, typically as an exemplary feature of a recirculation system, shown in FIGS. 1 and 2.

Referring to FIG. 3, the decontamination reactor 54 includes a reaction chamber 57 shown in the form of a column, though other shapes are possible. The decontamination reactor 54 includes an inlet 58, to allow the decontamination fluid to enter the reaction chamber 57, and an outlet 60, to allow the decontamination fluid to exit the reaction chamber 57. A support component 62 may be disposed within the reaction chamber 57, and is shown in the form of a solid, flexible sheet that has been coated with a bioactive coating to create a bioactive surface. Alternatively the support component may be impregnated with the decontaminating chemical additive. In some embodiments, the inner surface of the reaction chamber 57 may be coated with a bioactive coating to produce a bioactive surface. The bioactive coating typically comprises an enzyme capable of hydrolyzing the OP compound [i.e., a phosphoric triester hydrolase (EC 3.1.8)]. The decontamination fluid is allowed to enter the decontamination reactor 54 and contact the support component 62 to initiate the hydrolysis (i.e., the detoxification) of any OP compound(s) present in the decontamination fluid by the bioactive coating. The residence time of the decontamination fluid within the decontamination reactor 54 may be selected by the extent to which the hydrolysis of the OP compound is desired. The length of residence time may be adjusted by altering the flow rate of the decontamination fluid through the decontamination reactor 54, such as by controlling the size of the outlet 60, the size of inlet 58, the pressure of the decontamination fluid such as by adjusting the activity of the fluid pump 56, or a combination thereof.

Figure 4:
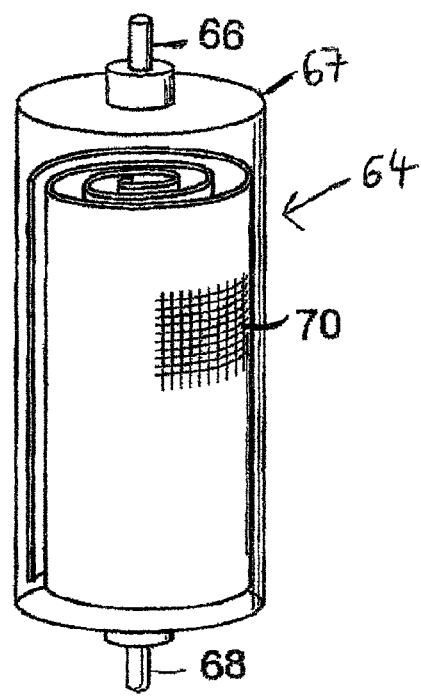
FIG. 4 illustrates an exemplary alternative embodiment for a decontamination reactor that might be used within the decontamination system, typically as an exemplary feature of a recirculation system, shown in FIGS. 1 and 2.

Referring to FIG. 4, an alternate embodiment for a decontamination reactor, indicated at 64, having a reaction chamber 67 depicted in the form of a column, and having an inlet 66 and outlet 68. Disposed within the reaction chamber 67 is an alternate embodiment of a support component 70. Instead of a solid sheet, the support component 70 comprises a bioactive coated mesh.

Figure 5:
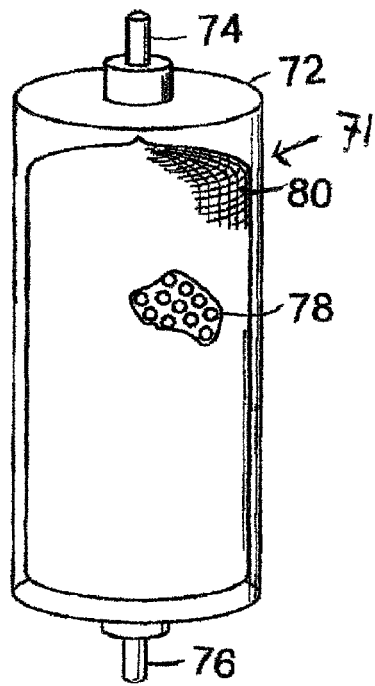
FIG. 5 illustrates a further exemplary alternative embodiment for a decontamination reactor that might be used within the decontamination system, typically as an exemplary feature of a recirculation system, shown in FIGS. 1 and 2, the decontamination reactor including a plurality of bioactive coated support components disposed within a container.

Referring to FIG. 5, the decontamination reactor 71 having a reaction chamber 72 depicted in the form of a column, also having an inlet 74 and an outlet 76, and disposed within the reaction chamber 72 is a plurality (e.g., a multiplicity) of bioactive coated spherical support components 78. As shown, the bioactive coated spherical support components 78 are disposed within a container 80 (e.g., a mesh container) for easy removal from the decontamination reactor 71 and/or to reduce or prevent clogging of the outlet 76. While the shape of the support component(s) 78 is shown as bioactive coated spheres, it is contemplated that the support component(s) 78 may be of any shape, material (e.g. metal, ceramic, etc.) and/or size suitable to be disposed within the decontamination reactor 71. Also, the support component(s) 78 need not be contained within container 80 as shown, but instead may be disposed freely within the reaction chamber 72.

Figure 6:
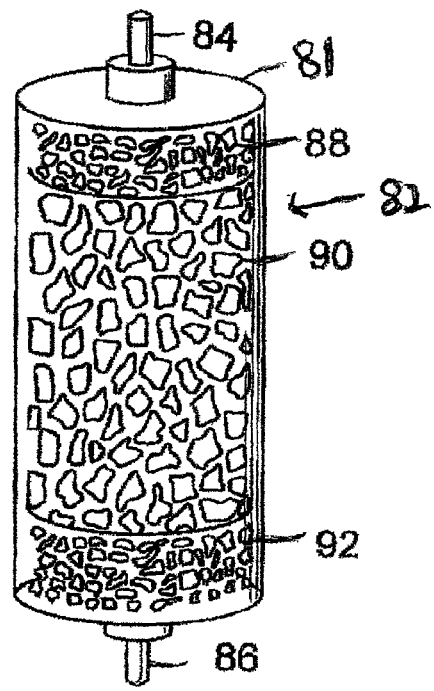
FIG. 6 illustrates a further exemplary alternative embodiment for a decontamination reactor that might be used within the decontamination system, typically as an exemplary feature of a recirculation system, shown in FIGS. 1 and 2, the decontamination reactor including multiple layers of bioactive coated support components.

Referring to FIG. 6, an alternative decontamination reactor 82 includes a reaction chamber 81 depicted in the form of a column, with the decontamination reactor 82 having an inlet 84 and an outlet 86. Disposed within the reaction chamber 81 are three separate layers; first layer 88, second layer 90, and third layer 92; of support components. As shown, the support components of each layer 88, 90 and 92 are random and irregular in shape. It is contemplated that multiple layers of support components, each having differing bioactive properties, may be used so that multiple OP compounds within a decontamination fluid may by detoxified at the same time. Alternatively, support components having differing properties may be admixed rather than layered.

Referring once again to FIGS. 1 and 2, it is shown that a decontaminated decontamination fluid may exit the decontamination reactor 54, often via an outlet 94, typically under the impetus of a fluid pump 96. The decontamination fluid stream passes through an analyzer, depicted schematically at 98, which detects the level of, for example, OP compound contaminant and/or reaction product(s) present in the exiting decontamination fluid. If the level of OP compound contaminant and/or reaction product(s) is undesirably large, the decontamination fluid may be selectively directed by a fluid flow direction selection device 160 (e.g., a valve, a manifold), schematically depicted as a valve, through a fluid conduit 100 to waste, depicted as a liquid waste disposal container 140 (FIG. 2). However, if the level of OP compound contaminant and/or reaction product(s) is acceptably low, the decontamination fluid may be directed to reenter the decontamination system 10, such as through a fluid conduit 102. For example, shown is the decontamination fluid being operatively connected by fluid conduit 102 to the liquid temperature controller 42 (FIG. 1) and/or the fluid conduit 40 (FIG. 2). Directing the flow of the decontamination fluid stream exiting the decontamination reactor 54 may be accomplished manually by an operator who monitors the analyzer 98 to determine the level of OP compound contaminant and/or reaction product(s) present in the decontaminated fluid stream and/or by automated (e.g., computerized) monitoring of the analyzer and manipulating fluid flow direction as would be known in the art.

The analyzer 98 may be any of a number of chemical analyzer(s) known in the art, such as an analyzer that uses liquid chromatography/spectroscopy, gas chromatography/flame, ionization photometry, water extraction/concentration/gas chromatography, mass spectroscopy, etc. The selected analyzer 98 may be used in accord with an EPA procedure for detection of such a contaminant in a fluid (e.g., a liquid) waste stream such as using EPA SW-846 and/or Method 3571. Conducting an EPA procedure would tailor the analysis to different sample matrices; if a process stream is not listed, the matrix that the sample most resembles may to be used.

As indicated schematically in FIG. 2, level controller(s) ("LC") 104 generally may be provided to reduce or prevent overfilling for one or more of the supply(s) of decontamination fluid 36, the separator(s) 50 and/or the decontamination reactor(s) 54, during operation. Additionally, the level controller(s) 104 may help ensure that the level of decontamination fluid at various points in the decontamination system 10 remains sufficient.

Figure 7:
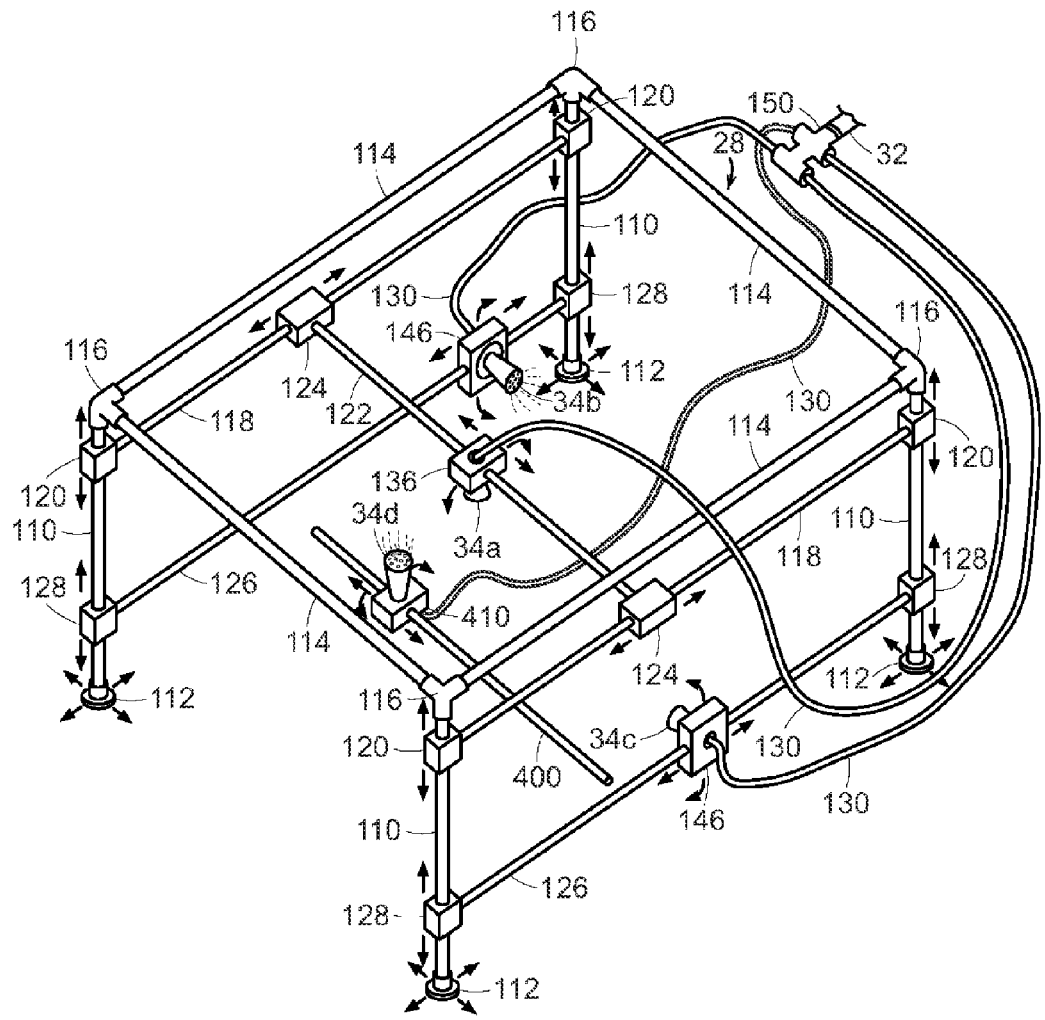
FIG. 7 depicts exemplary features relating to a liquid sprayer frame that may be used with the decontamination system shown in FIGS. 1 and 2.

FIG. 7 depicts an exemplary liquid sprayer frame 28 that may be used with the decontamination system 10. The liquid sprayer frame 28 typically is lightweight and/or collapsible so that the liquid sprayer frame 28 can be readily broken down and transported to a desired location and then assembled on site. Portion(s) of the liquid sprayer frame 28 may be fashioned from sturdy component(s) (e.g., tubing) such as metal (e.g., aluminum, steel), ceramic, and/or plastic. The liquid sprayer frame 28 shown features a vertical support leg 110 (e.g., one or more vertical support legs; four shown). The lower end of a vertical support leg 110 may be disposed within a ground-contacting foot 112. In various embodiments, the ground contacting foot 112 may be in the form of movement device such as a wheel, a tread, a ball, a low friction surface (e.g., a plastic foot pad, a Teflon foot pad) or combination thereof, to permit the liquid sprayer frame 28 to be readily moved from one location to another. One or more horizontal brace member(s) 114 may be interconnected with the vertical support leg(s) 110, to form, for example, a generally cubic rectangular structure shown at FIG. 7, though other structure shapes are possible (e.g., a plane based on one or two vertical support legs 110, a pyramid based on three support legs 110, etc). The interconnection between the horizontal brace member(s) 114 and the vertical support leg(s) 110 may be at fixed and/or movable position(s) (e.g., a slide able position). Connecting device(s) 116 [e.g., corner bracket(s), roller assembly(s)] may be used to interconnect the horizontal brace member(s) 114 to the vertical support leg(s) 110, and exemplarily depicted are connecting devices 116 as corner brackets at fixed positions on the upper ends of the vertical support legs 110.

Side rail(s) 118 may extend between any of the vertical support leg(s) 110, and exemplarily shown is side rails 118 extending to support legs 110 on either lateral side of the liquid sprayer frame 28. The interconnection between the side rail(s) 118 and the vertical support leg(s) 110 may be at fixed and/or movable position(s). The side rail(s) 118 may be interconnected to the vertical support leg(s) 110 by connecting device(s) 120 [e.g., bracket(s), roller assembly(s)], and exemplarily depicted are connecting device(s) 120 as roller assembly(s) that permit the side rail(s) 118 to move along the vertical support leg(s) 110 by movement of the connecting device(s) 120.

Cross-member(s) 122 may extend between the side rail(s) 118, and the interconnection between the cross-member(s) 122 and the side rail(s) 118 may be at fixed and/or movable position(s). The cross-member(s) 122 may be interconnected to the side rail(s) 118 by connecting device(s) 124 [e.g., bracket(s), roller assembly(s)], and exemplarily depicted are connecting device(s) 124 as roller assembly(s) that permit the cross-member(s) 122 to move along the side rail(s) 118 by movement of the connecting device(s) 124.

The cross-member(s) 122 may carry the liquid applicator(s) 34, represented by spray nozzle 34a, and the connection between the cross-member(s) 122 and the spray nozzle 34a may be at fixed and/or movable position(s). The spray nozzle 34a may be attached to the cross-member(s) 122 by connecting device(s) 136, depicted as a roller assembly. Movement of the spray nozzle 34a via the roller assembly connecting device(s) 136 allows the spray nozzle 34a to apply decontamination fluid to different portions of the object 12 (not shown) being decontaminated.

Exemplary movement(s) by the roller assembly connecting device(s) 136 toward the lateral side(s) of the liquid sprayer frame 28 and/or pivot motions relative to the cross-member 122 allows application of decontamination fluid to different portions of the object 12 (not shown) being decontaminated.

Exemplary movement(s) of the cross-member(s) 122 toward the longitudinal side(s) of the liquid sprayer frame 28 via the roller assembly connecting device(s) 124 moves the spray nozzle 34a attached to the cross-member(s) 122, thus allowing application of decontamination fluid to different portions of the object 12 (not shown) being decontaminated.

Exemplary movement(s) of the side rail(s) 118 via the roller assembly connecting device(s) 120 toward the upper and/or lower portions of the liquid sprayer frame 28 moves the cross-member(s) 122 attached to the side rail(s) 118 and the spray nozzle 34a attached to the cross-member(s) 122, thus allowing application of decontamination fluid to different portions of the object 12 (not shown) being decontaminated.

Another side rail 118 (e.g., a plurality of side rails 118), another cross member 122 (e.g., plurality of cross members 122), or a combination thereof, may be added to the liquid sprayer frame 28 to support another liquid applicator 34 (e.g., a plurality of liquid applicators). Such additional liquid applicators 34 may provide improved coverage of the object 12 (not shown) by the applied decontamination fluid. For example, horizontal side rails 126 are depicted as secured by connecting devices 128 to vertical support legs 110 on either lateral side of the liquid sprayer frame 28. The connecting devices 128 are depicted as roller assembly(s) capable of movement up and down the vertical support legs 110. The side rails 126 carry liquid applicators 34b and 34c, depicted in the form of spray nozzles. The liquid applicators 34b and 34c may be positioned to spray decontamination fluid upward, as depicted by the liquid applicator 34b, to decontaminate a surface such as the bottom of the object 12 (e.g., the undercarriage of a vehicle; not shown).

In some embodiments, one or more of the liquid applicators 34b and 34c may be attached to the side rail(s) 126 via connecting device(s) 146. The connecting device(s) 146 are depicted as roller assembly(s) capable of movement toward the longitudinal side(s) of the liquid sprayer frame 28 and/or pivot motions relative to the side-rail(s) 126, thus allowing application of decontamination fluid to different portions of the object 12 (not shown) being decontaminated. In another example, another liquid sprayer frame, depicted as a ground rail (e.g., a pipe) 400, may have a liquid applicator 34d, depicted as a spray nozzle. The connecting device 410, depicted as a roller assembly, attaches the liquid applicator 34d to the ground rail 400 and allows the liquid applicator 34d to be moved along the ground rail 400 to spray decontamination fluid upward to various lower surfaces of the object 12.

As described above, the various attachment(s) between the side rail(s) 118, the cross member(s) 122, the ground rail(s) 400, and/or the liquid applicator(s) 34 may be made via connecting device(s), such as those depicted 120, 124, 136, 146, and/or 410. In some embodiments, such connecting devices may be like devices; or different devices, such as: devices constructed to attach to liquid sprayer frame 28 components and/or ground rail(s) 400 of different width(s), size(s), etc.; devices having different mobility capabilities; devices having different capabilities to support the attached component(s) (e.g., a liquid applicator 34), etc., as would be known in the art. For example, the depicted roller assembly connecting device(s) 120, 124, 136, 146, and/or 410 may comprise hand-operated roller device(s); motorized, remotely-controlled roller device(s), which permits movement of the roller assembly an operator distal to the roller device(s) (e.g., an operator outside of the chamber 14); and/or roller device(s) actuated by a controller that has been preprogrammed with movement instruction(s) (i.e., a preprogrammed computerized controller); in a manner known in the art. In some embodiments, such connecting device(s) may allow for rotation and/or pivoting motion of an attached component (e.g., a side rail, a cross member, a liquid applicator, etc).

In operatively connecting the liquid applicator(s) 34 to the supply of the decontamination fluid 36, FIG. 1 depicts the liquid applicator 34 connected to the fluid conduit 32, which is connected to intervening decontamination fluid control system 30 components that connect to the supply of the decontamination fluid 36. FIG. 7 depicts an alternative embodiment, where fluid conduits 130 [e.g., flexible hose(s)] are interconnected to each of the liquid applicators 34a, 34b, 34c and 34d. Fluid conduits 130 generally are operatively interconnected to a fluid flow selection device 150 (e.g., a valve, a manifold), with a manifold being depicted. The fluid flow selection device 150 is typically used to partition the decontamination fluid flowing from the supply of the decontamination fluid, via any intervening components such as the depicted conduit 32, into a plurality of fluid conduits 130 for connection to a plurality of liquid applicators 34. Such fluid conduit(s) 130 and fluid flow selection device(s) 150 may be part of the decontamination fluid control system 30, its operation being manual and/or automated.

In some embodiments, one or more components of the decontamination system 10, such as one or more components of the decontamination fluid flow control system 30 and/or the recirculation system 44, may be placed on a moveable platform 280 (FIG. 1). Placement of the systems(s) component(s) in a partly or fully assembled form on the moveable platform 280 may provide for a more rapid final assembly for operation of the system(s) and/or ease of movement of the component(s) to a position near an object 12. The moveable platform 280 typically comprises platform movement device(s) 290, depicted in the form skid(s)/ski(s) 290, though other movement device(s) 290 (e.g., wheels) are possible.

The decontamination fluid (e.g., suspension, solution, emulsion, a slurry) usually maintained within the decontamination fluid supply tank 36 and otherwise used within the decontamination system 10, generally comprises a mixture of a liquid carrier (i.e., a liquid component) that typically comprises water, and a decontaminating chemical additive. The decontaminating chemical additive typically comprises an enzyme-based biomolecule composition [e.g., an enzyme, an enzyme that is part of other biomolecule(s) such as cellular material(s)] and/or a proteinaceous molecule such as a peptide having an antimicrobial activity. Often the enzyme is capable of degrading a chemical, such as degrading an OP compound by hydrolyzing a chemical bond in the OP compound. An enzyme-based additive possesses catalytic function, and thus the enzyme-based additive may not be consumed in the decontamination process itself and may remain active following the decontamination process. As a result, a decontamination fluid comprising a decontaminating chemical additive comprising an enzyme may be particularly suitable for being recirculated and reused for further decontamination efforts, as described herein.

Enzymes are typically capable of catalyzing a reaction in both directions (i.e., a "reversible reaction"), where substrate and product are converted back and forth from one to the other. The net direction of such a reversible reaction is generally dependent on the concentration of the substrate(s)/product(s) and reaction environment, and it is contemplated that the enzymes described herein may be used in either or both reaction directions. For example, an enzyme normally described as an esterase may function as an ester synthetase depending upon the concentration of the substrate(s) and/or the product(s), such as an excess of hydrolyzed esters (typically considered the product of an esterase reaction) relative to unhydrolyzed esters (typically considered the substrate of the esterase reaction).

Examples of an enzyme that may be used in a decontaminating chemical additive include an esterase, a lipolytic enzyme, a peptidase, a lysozyme, or a combination thereof. Examples of an esterase include a carboxylic ester hydrolase, (EC 3.1.3), a phosphoric monoester hydrolase (EC 3.1.3), a phosphoric diester hydrolase (EC 3.1.4), a sulfuric ester hydrolase (EC 3.1.6), a phosphoric triester hydrolase (EC 3.1.8) or a combination thereof.

A phosphoric triester hydrolase (EC 3.1.8) catalyzes the hydrolytic cleavage of an ester from a phosphorus moiety. Enzymatic hydrolysis occurs at the phosphoryl center's chemical bond resulting in predictable byproducts that are acidic in nature but generally benign from a neurotoxicity perspective. A phosphoric triester hydrolase (EC 3.1.8) may be capable of detoxifying a chemical weapons agent, such as, tabun ("GA"), sarin ("GB"), soman ("GD"), cyclosarin, VX, and its isometric analog Russian VX ("VR" or "R-VX"); a chemical weapons agent analog, a chemical weapons surrogate; a pesticide, or a combination thereof. By comparison, chemical hydrolysis (e.g. sodium hydroxide) can be much less specific and in the case of VX may produce byproducts that are neurotoxic.

There are a large number of phosphoric triester hydrolases that are capable of degrading a wide range of OP compounds, such as organophosphorus hydrolase ("OPH"), organophosphorus acid anhydrolase ("OPAA"), and DFPase, which detoxifies O,O-diisopropyl phosphorofluoridate ("DFP"). The enzymes from each source are diverse, each with their own characteristics, and a particular enzyme should be considered for selection on the enzyme's own merit for use in a particular application. For example, a Mazur-type DFPase and an organophosphorus anhydrolas are specific to the hydrolysis of the P—F bond of DFP and G-agents. In another example, two characteristics that may be useful for the application of an enzyme as a biocatalyst having relative stability and broad substrate specificity are met by an OPH enzyme. An organophosphorus hydrolase typically has broader substrate specificity relative to a DFPase and/or an OPAA, and is a relatively stable dimer, with a thermal $T_m$ of approximately 75° C. and a conformational stability approaching 40 kcal/mol.

Examples of a phosphoric triester hydrolase include an aryldialkylphosphatase (EC 3.1.8.1), a diisopropyl-fluorophosphatase (EC 3.1.8.2), or a combination thereof. Examples of an aryldialkylphosphatase include an organophosphorus hydrolase, a paraoxonase, a carboxylase (EC 3.1.1.1) having aryldialkylphosphatase activity, or a combination thereof. Examples of an organophosphorus hydrolase include an *Agrobacterium radiobacter* P230 organophosphate hydrolase, a *Flavobacterium balustinum* parathion hydrolase, a *Pseudomonas diminuta* phosphotriesterase, a *Flavobacterium* sp opd gene product, a *Flavobacterium* sp. parathion hydrolase opd gene product, or a combination thereof. An example of a paraoxonase is human paraoxonase. An example of an animal carboxylase includes an insect carboxylase (e.g., a *Plodia interpunctella* carboxylase, *Chrysomya putoria* carboxylase, *Lucilia cuprina* carboxylase, *Musca domestica* carboxylase). Examples of a diisopropyl-fluorophosphatase include an organophosphorus acid anhydrolase, a squid-type DFPase, a Mazur-type DFPase, or a combination thereof. Examples of an organophosphorus acid anhydrolase include an *Altermonas* organophosphorus acid anhydrolase, a prolidase, or a combination thereof. Examples of an *Altermonas* organophosphorus acid anhydrolase include an *Alteromonas* sp JD6.5 organophosphorus acid anhydrolase, an *Alteromonas haloplanktis* organophosphorus acid anhydrolase, an *Altermonas undina* organophosphorus acid anhydrolase, or a combination thereof. Examples of a prolidase comprise a human prolidase, a *Mus musculus* prolidase, a *Lactobacillus helveticus* prolidase, an *Escherichia coli* prolidase, an *Escherichia coli* aminopeptidase P, or a combination thereof. Examples of a squid-type DFPase include a *Loligo vulgaris* DFPase, a *Loligo pealei* DFPase, a *Loligo opalescens* DFPase, or a combination thereof. Examples of a Mazur-type DFPase include a mouse liver DFPase, a hog kidney DFPase, a *Bacillus stearothermophilus* strain OT DFPase, an *Escherichia coli* DFPase, or a combination thereof. Other examples of a phosphoric triester hydrolase include a *Plesiomonas* sp. strain M6 mpd gene product, a *Xanthomonas* sp. phosphoric triester hydrolase, a Tetrahymena phosphoric triester hydrolase, or a combination thereof.

A lipolytic enzyme catalyzes a reaction on lipid substrate (e.g., a fatty acid, a petroleum hydrocarbon), and is often an esterase when the substrate comprises a fatty acid (e.g., a fatty acid ester). Examples of a lipolytic enzyme include a carboxylesterase (EC 3.1.1.1), a lipase (EC 3.1.1.3), a lipoprotein lipase (EC 3.1.1.34), an acylglycerol lipase (EC 3.1.1.23), a hormone-sensitive lipase (EC 3.1.1.79), a phospholipase $A_1$ (EC 3.1.1.32), a phospholipase $A_2$ (EC 3.1.1.4), a phosphatidylinositol deacylase (EC 3.1.1.52), a phospholipase C (EC 3.1.4.3), a phospholipase D (EC 3.1.4.4), a phosphoinositide phospholipase C (EC 3.1.4.11), a phosphatidate phosphatase (EC 3.1.3.4), a lysophospholipase (EC 3.1.1.5), a sterol esterase (EC 3.1.1.13), a galactolipase (EC 3.1.1.26), a sphingomyelin phosphodiesterase (EC 3.1.4.12), a sphingomyelin phosphodiesterase D (EC 3.1.4.41), a ceramidase (EC 3.5.1.23), a wax-ester hydrolase (EC 3.1.1.50), a fattyacyl-ethyl-ester synthase (EC 3.1.1.67), a retinyl-palmitate esterase (EC 3.1.1.21), a 11-cis-retinyl-palmitate hydrolase (EC 3.1.1.63), a all-trans-retinyl-palmitate hydrolase (EC 3.1.1.64), a cutinase (EC 3.1.1.74), an acyloxyacyl hydrolase (EC 3.1.1.77), a petroleum lipolytic enzyme, or a combination thereof. In many embodiments, a lipolytic enzyme can generally catalyze a reaction on a lipid substrate to release a fatty acid. Though a lipolytic enzyme often produces a product that is more aqueous soluble and/or removable after a single chemical reaction, in some aspects, a series of enzyme reactions is needed to release a fatty acid and/or degrade a lipid, such as in the case of a combination of a sphingomyelin phosphodiesterase that produces a N-acylsphingosine from a sphingomyelin phospholipid, followed by a ceramidase hydrolyzing an amide bond in a N-acylsphingosine to produce a free fatty acid and a sphingosine. A petroleum lipolytic enzyme generally can catalyze a reaction that improves a petroleum hydrocarbon's aqueous solubility, absorption into a material (e.g., a coating, a film), or a combination thereof, and often comprises a plurality of enzymes to catalyze a series of reactions to produce one or more product(s) with those changes in properties relative to the hydrocarbon substrate(s).

An enzyme may be purified to varying degrees, though in some cases isolated cells and/or cell fragments comprising such enzyme(s) may be used. For example, a petroleum lipolytic enzyme (e.g., a plurality of petroleum lipolytic enzymes) may be produced in cell (e.g., a microorganism), and a decontaminating chemical additive may comprise the cell and/or cellular component(s) comprising the enzyme (e.g., a whole cell material. a cell fragment, a purified enzyme, etc.). Examples of microorganism genera and strains, with exemplary culture collection identifications, contemplated for use in production of a petroleum lipolytic enzyme include *Azoarcus* [DSMZ Nos. 12081, 14744, 6898, 9506 (sp. strain T) and 15124], *Blastochloris* (DSMZ Nos. 133, 134, 136, 729 and 13255 (ToP1)), *Burkholderia* (DSMZ Nos. 9511, 50341, 13243, 13276 and 11319), *Dechloromonas* (ATCC No. 700666; DSMZ No. 13637), *Desulfobacterium* [ATCC Nos. 43914, 43938 and 49792; DSMZ: 6200 (*cetonicum* strain Hxd3)], *Desulfobacula* (ATCC No. 43956; DSMZ Nos. 3384 and 7467), *Geobacter* [DSMZ Nos. 12179, 13689 (*grbiciae* TACP-2T), 13690 (*grbiciae* TACP-5), 7210 (*metallireducens* GS15), 12255, and 12127], *Mycobacterium* (ATCC Nos. 10142, 10143, 11152, 11440 and 11564), *Pseudomonas* (ATCC Nos. 10144, 10145, 10205, 10757 and 27853), *Rhodococcus* (ATCC Nos. 10146, 11048, 12483, 12974 and 14346), *Sphingomonas* (DSMZ Nos. 7418, 10564, 1805, 13885 and 6014), *Thauera* [DSMZ Nos. 14742, 12138, 12266, 14743, 12139 and 6984 (*aromatica* K172)], *Vibrio* (ATCC Nos. 11558, 14048, 14126, 14390 and 15338), or a combination thereof. Specific examples of biological culture collections referred to herein where such microorganisms are kept include the American Type Culture Collection ("ATCC""; P.O. Box 1549, Manassas, Va. 20108-1549, U.S.A), and the Deutsche Sammlung von Mikroorganismen and Zellkulturen ("DSMZ""; GmbH, Mascheroder Weg 1B, D-38124 Braunschweig, Germany).

A sulfuric ester hydrolase (EC 3.1.6) catalyzes the hydrolysis of a sulfuric ester bond. Examples of a sulfuric ester hydrolase include an arylsulfatase (EC 3.1.6.1), a sterylsulfatase (EC 3.1.6.2), a glycosulfatase (EC 3.1.6.3), a N-acetylgalactosamine-6-sulfatase (EC 3.1.6.4), a cholinesulfatase (EC 3.1.6.6), a cellulose-polysulfatase (EC 3.1.6.7), a cerebroside-sulfatase (EC 3.1.6.8), a chondro-4-sulfatase (EC 3.1.6.9), a chondro-6-sulfatase (EC 3.1.6.10), a disulfoglucosamine-6-sulfatase (EC 3.1.6.11), a N-acetylgalactosamine-4-sulfatase (EC 3.1.6.12), an iduronate-2-sulfatase (EC 3.1.6.13), a N-acetylglucosamine-6-sulfatase (EC 3.1.6.14), a N-sulfoglucosamine-3-sulfatase (EC 3.1.6.15), a monomethyl-sulfatase (EC 3.1.6.16), a D-lactate-2-sulfatase (EC 3.1.6.17), a glucuronate-2-sulfatase (EC 3.1.6.18), or a combination thereof.

A peptidase catalyzes a reaction on a peptide bond, though other reactions (e.g., esterase activity) may also be catalyzed in some cases. A peptidase generally may be categorized as either an exopeptidase (EC 3.4.11-19) or an endopeptidase (EC 3.4.21-24 and EC 3.4.99). Examples of a peptidase include an alpha-amino-acyl-peptide hydrolase (EC 3.4.11), a peptidyl-amino-acid hydrolase (EC 3.4.17), a dipeptide hydrolase (EC 3.4.13), a peptidyl peptide hydrolase (EC 3.4), a peptidylamino-acid hydrolase (EC 3.4), an acylamino-acid hydrolase (EC 3.4), an aminopeptidase (EC 3.4.11), a dipeptidase (EC 3.4.13), a dipeptidyl-peptidase (EC 3.4.14), a tripeptidyl-peptidase (EC 3.4.14), a peptidyl-dipeptidase (EC 3.4.15), a serine-type carboxypeptidase (EC 3.4.16), a metallocarboxypeptidase (EC 3.4.17), a cysteine-type carboxypeptidase (EC 3.4.18), an omega peptidase (EC 3.4.19), a serine endopeptidase (EC 3.4.21), a cysteine endopeptidase (EC 3.4.22), an aspartic endopeptidase (EC 3.4.23), a metalloendopeptidase (EC 3.4.24), a threonine endopeptidase (EC 3.4.25), an endopeptidase of unknown catalytic mechanism (EC 3.4.99), a chymotrypsin (EC 3.4.21.1), or a combination thereof.

It should be understood, however, that various decontaminating chemical additive(s) may be used depending upon the type of contamination. For example, where there is biological contamination from a contaminant having biological spores, the chemical decontaminating chemical additive may comprise an antibiological agent (e.g., an antibacterial agent, an antifungal agent, an antiviral agent, an antifouling agent, an antimicrobial agent, an antifungal agent, an antialgae agent, an antibacterial agent, an antimildew agent, a peptidic agent, a preservative, a biocide, a biostatic, etc.), alone or in combination with another decontaminating chemical additive (e.g., an OP degrading decontaminating chemical additive). In specific embodiments the antibiological agent comprises the ProteCoat® agent.

Thus, a decontaminating chemical additive may comprise one or more enzyme(s), cellular material(s) (e.g., a particulate biomolecule such a cell wall material), or antimicrobial agent(s) [e.g., one or more antibiological (e.g., antifungal, antibacterial) peptidic agent(s) [e.g., peptide(s)], preservative(s), biocide(s)], in various combinations. For example, the decontaminating chemical additive may comprise one or more enzyme(s) that typically act as catalyst(s) in the conversion of one or more contaminating compound(s) into one or more different compound(s) [(e.g., organophosphorus compound(s), lipid(s)] to reduce the content of the contaminating compound(s). In some embodiments, a decontaminating chemical additive may merely bind the contaminant, but does not detectably catalyze a reaction, such as in the case of an antibody or other binding molecule(s) (e.g., an enzyme inhibited by binding the contaminant). A decontaminating chemical additive comprising a binding agent may reduce a contaminant's ability to contaminate an object.

Various biochemical additive(s) [e.g., enzyme(s), antibiological peptidic agent(s), binding agent(s)] that may be used as decontaminating chemical additives are described in U.S. patent application Ser. Nos. 10/655,345; 10/884,355; 11/368, 086; 11/865,514; 12/243,755; and 12/474,921 each incorporated by reference in their entirety. In an embodiment, the decontaminating chemical additive comprises an enzyme-based decontamination substance known commercially as $OPD_{tox}$™ and/or DeGreez™, and/or comprises a proteinaceous anti-biological composition known commercially as ProteCoat®.

In many embodiments, the decontamination fluid mixture has a decontaminating chemical additive to liquid carrier (e.g., water) ratio that is from about 50 units decontaminating chemical additive per 1 gallon of liquid carrier (1 unit is about 100 grams) to about 150 units decontaminating chemical additive per 1 gallon liquid carrier. In various embodiments, the decontaminating chemical additive to liquid carrier ratio is approximately 100 units decontaminating chemical additive per 1 gallon of liquid carrier. In some embodiments, the decontamination fluid (e.g., the decontaminated fluid runoff) comprises about 1% to about 40% (e.g., about 10 mg/ml to about 400 mg/ml; about 30% to about 40%) decontaminating chemical additive in a liquid carrier (e.g., an OPDtox™ powder in water). A lower concentration of the decontaminating chemical additive may improve ease of fluid transfer through the decontamination system, while a higher concentration of the decontaminating chemical additive may improve (e.g., accelerate) decontamination of an object.

The liquid component and/or decontaminating chemical additive, prior to being admixed into the decontamination fluid, may comprise one or more additional material(s) (e.g., a reaction detection agent) in various combinations, and/or those additional material(s) may be added to the fluid mixture separately as desired. For example, the decontamination reaction may be measured and/or visualized by a reaction detection agent such as a pH indicator detecting a change in pH by the reaction, such as may occur with a colorimetric and/or a fluorimetric indicator (e.g., Alizarin, Alizarin S, Brilliant Yellow, Lacmoid, Neutral Red, Rosolic Red, SNARF-1, BCECF, HPTS, Fluoroescein). In another example, the reaction detection agent may be a substrate that produces a detectable (e.g., visible, UV detectable, etc.) change as a product is created. In another example, a decontaminating chemical additive comprises a caustic agent (e.g., a bleaching agent, decontamination solution 2—"DS2") and/or decontamination foam (e.g., Sandia, Decon Green). In a further example, the decontamination fluid may comprise: a pH buffer (e.g., a bicarbonate, a monobasic phosphate buffer, a dibasic phosphate buffer, Trizma base, a 5 zwitterionic buffer, triethanolamine) to help maintain the pH of the decontaminating chemical additive within a range suitable for activity; a coenzyme; an enzyme activator (e.g., metal ions that enhance an enzyme's activity); a salt (e.g., to maintain an suitable ionic strength); and/or a detergent, etc. in various combinations as appropriate for promoting the activity of component(s) such as enzyme(s) and/or antibiological agent(s).

For example, in some embodiments, a decontamination process creates an acid as a byproduct as an enzymatic decontaminating chemical additive hydrolyzes an organophosphorus compound. The decontamination fluid runoff present in the liquid collector may be expected to be acidic due to the product from that enzymatic reaction. Therefore, the decontamination fluid may also comprise a buffer (e.g., calcium carbonate, sodium bicarbonate) which moderates the pH factor of hydrolyzed product(s) resulting from the decontamination process. In some embodiments, the buffer comprises in amount sufficient to maintain the pH level of the decontamination fluid substantially neutral, such as in an approximate range from about 7 to about 8.5.

In another example, a detergent such as one used in the art (e.g., a dishwashing solution such as a Dawn® dishwashing liquid, a soap solution, etc.) may be added to the decontamination fluid, such as for promoting decontamination of contaminant(s) of various solubility(s) by enhancing dispersion into the decontamination fluid. In another example, the activity of many lipolytic enzymes are promoted by a molecular interface of hydrophobic and hydrophilic material(s), and the decontamination fluid may comprise a hydrophilic (e.g., water), a hydrophobic (e.g., an oil, a solvent), and/or an amphipathic (e.g., detergent) material (e.g., a liquid component) to promote activity of such a lipolytic enzyme. Examples of enzyme(s), cellular material(s), molecule(s) with binding property(s), antimicrobial agent(s), caustic agent(s), decontamination foam(s), reaction detection agent(s), pH buffer(s), coenzyme(s), enzyme activator(s), liquid component(s), and other material(s) that may be used in light of the present disclosures, and preparation techniques (e.g., isolation, purification, modification) have been described in U.S. patent application Ser. Nos. 10/655,345, 10/884,355, 11/368,086, 11/865,514, 12/243,755, and 12/474,921, each incorporated by reference.

In certain embodiments, a decontamination fluid comprises a fire fighting material (e.g., a fire fighting foam). The exposure to a contaminant (e.g., an OP compound) to a fire and/or excessive heat may cause the contaminant to be dispersed into the ambient air, making exposure by object(s) and/or personnel to contaminant more prevalent. Accordingly, it may be desirable to suppress a fire (e.g., extinguish a fire, reduce a fire, deter the initiation of a fire) on and/or in the vicinity of an object. A decontamination fluid may be in the form of a fire fighting composition capable of suppressing a fire and/or detoxifying a chemical (e.g., an OP compound), a biological agent, etc. For example, such a fire fighting material may detoxify an area contaminated with an OP compound concurrently with extinguishing a fire within the area, consequentially reducing the exposure (e.g., possible contact) of object(s) and/or personnel to the OP compound. In another example, such a fire fighting material may suppress a potential or ongoing fire on an object (e.g., a battle damaged piece of equipment) that may have been contaminated with an OP compound, a biological agent, etc. In some embodiments, the fire fighting material(s) described herein may deliver a minimal logistical impact, be effective, be non-corrosive, be environmentally benign and/or have a broad spectrum decontamination activity suitable for use on a variety of surface(s) and/or material(s).

The system(s) and method(s) described herein may be combined with other composition(s), equipment, and/or technique(s) for decontamination. For example, oxidizing material(s) (e.g., $TiO_2$, porphyrins) may be incorporated into a coating of an object that, when exposed to sustained high levels of UV light, degrades chemical agent(s) such as OP compounds. In another example, post-contamination and/or decontamination washing may occur with hot water, detergent(s), organic solvent(s), caustic solution(s) (e.g., DS2, bleach); and/or decontamination foam(s) (e.g., Eco, Sandia, Decon Green). Chemical agent resistant coatings ("CARCs") have been developed to withstand repeated decontamination efforts with such caustic agent(s) and organic solvent(s), and may be applied to an object that may undergo contamination during use. In another example, intensive heat and carbon dioxide may be applied for sustained period(s) to degrade a chemical agent on an object.

It will be understood herein that a given range includes all integers and sub-ranges comprised within the cited range. For example, citation of a range "0.03% to 0.07%" refers to specific values and sub-ranges within the cited range, such as, for example, 0.03%, 0.04%, 0.05%, 0.06%, and 0.07%, as well as various combinations of such specific values, such as, for example, 0.03%, 0.06% and 0.07%, 0.04% and 0.06%, or 0.05% and 0.07%, as well as sub-ranges such as 0.03% to 0.05%, 0.04% to 0.07%, or 0.04% to 0.06%, etc. Examples of specific values that can be within a cited range include 0.000001, 0.00001, 0.0001, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1.0, 1.1, 1.2, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1050, 1100, 1150, 1200, 1250, 1300, 1350, 1400, 1450, 1500, 1600, 1700, 1800, 1900, 2000, 3000, 4000, 5000, 6000, 7000, 8000, 9000, 10,000, or more.

SPECIFIC EXAMPLE

The general effectiveness of various embodiments is demonstrated in the following Example that illustrates some methods for preparing compositions. The following Example is provided so that the embodiments might be more fully understood, and is illustrative only and should not be construed as limiting in any way. Starting materials are made according to procedures known in the art or as illustrated herein.

This Example demonstrates the use of a fire fighting materials comprising an OP compound degrading decontamination chemical additive, OPD$_{tox}$™. Specific fire fighting materials are provided which, in addition to be being configured to degrade OP compounds, are configured to extinguish fires. Methods for fabricating and using such fire fighting materials are also provided. Six different fire fighting foams were evaluated, though it is contemplated that other fire fighting materials may be used. A summary of the assay, procedures and quantitative results are provided below.

The fire fighting materials used included ANSUL® ANSULITE® Fire fighting Foams (Tyco International, Ltd., 9 Roszel Road Princeton, N.J. 08540 USA), specifically: 3% Regular Protein Concentrate; 3% Fluoroprotein Concentrate; Silv-Ex®; Target 7®; 3% Aqueous Film-Forming Concentrate; and 3×3 Low Viscosity Alcohol Resistant Concentrate. The fire fighting foams were prepared as shown in the following Table.

TABLE 1

Formulation of the fire fighting foams.

| Fire Fighting Foam | Foam (mL) | Water (mL) |
| --- | --- | --- |
| 3% Regular Protein Concentrate | 1.5 | 48.5 |
| 3% Fluoroprotein Concentrate | 1.5 | 48.5 |
| Silv-Ex ® | 0.5 | 49.5 |
| Target 7 ® | 3.0 | 47.0 |
| 3% Aqueous Film-Forming Concentrate | 1.5 | 48.5 |
| 3 × 3 Low Viscosity Alcohol Resistant Concentrate | 1.5 | 48.5 |

The fire fighting foams were placed in a 50 mL eppendorf tube and agitated on a shaker until visually determined to be homogeneous. To assay the enzymatic activity of OPDtox™ formulated into the fire fighting foam(s), the following solutions were prepared as shown in the Table below.

TABLE 2

Solutions

| Solution | Formulation |
| --- | --- |
| 2× Tripart Buffer (pH 9.0) | 7.808 g 2-(N-morpholino) ethanesulfonic acid ("MES"); 2.58 mL N-ethylmorpholine; and 2.15 mL diethanoliamine; bring to 200 mL with deionized $H_2O$ ("diH20") |
| 100 mM Demeton-S in methanol ("MeOH") | 1.949 mL MeOH; and 51 uL Demeton-S (Chem Service, Inc.# PS-662; Sigma-Aldrich Corp., St. Louis, MO, USA) |
| 40 mM 5,5'-Dithio-bis(2-nitrobenzoic acid ("DTNB") | 1.585 g DTNB; and 100 mL 1× Tripart (pH 9.0) |

Control samples were prepared as follows. A 50 mg/ml and a 25 mg/ml solution of OPDtox™ was prepared in tap water. 2 µL of each dilution was loaded in triplicate in a 96-well plate. A reaction mixture of 7:2 1.4× tripart buffer:40 mM DTNB was formulated, and 90 µL of the reaction mixture added into each well. 8 µL of 100 mM Demeton-S was added into each well.

A control blank was prepared as follows. 70 µL 1.4× Tripart Buffer, 20 µL 40 mM DTNB, and 8 µL 100 mM Demeton-S was added into each well. 2 µL of tap water was substituted for the OPDtox™ solution to serve as a control blank.

Experimental samples were prepared as follows. A 50 mg/ml and a 25 mg/ml solution of OPDtox™ was prepared in each ANSUL® fire fighting foam, formulated as described in Table 1. 2 µL of each dilution was loaded for each foam in triplicate into a 96-well plate. 70 µL 1.4× tripart buffer was added into each well. 20 µL 40 mM DTNB was added into each well. 8 µL of 100 mM Demeton-S was added into each well.

An assay blank was prepared as follows. 70 µL 1.4× tripart buffer, 20 µL 40 mM DTNB, and 8 µL 100 mM Demeton-S was added into each well. 2 µL of the ANSUL® fire fighting foam(s) was substituted for the OPDtox™ solution to serve as an assay blank.

Analysis was conducted as follows. Absorbance readings were taken every 10 seconds at 405 nm, for a total of 500 readings. A 96-well plate reader was used to analyze the samples. The appearance of the product of hydrolysis, 2-thiopyridone, was monitored at 405 nm, and was used to determine the rate of hydrolysis. The kinetic curve of the blank was subtracted from the corresponding kinetic curve of the sample. For the analysis of the samples, an initial rate slope was determined and used to calculate specific activity using Beer's Law.

The quantitative results were as follows. All 6 fire fighting foams (i.e., 3% Regular Protein Concentrate, 3% Fluoroprotein Concentrate, Silv-Ex®, Target 7®, 3% Aqueous Film-Forming Concentrate, 3×3 Low Viscosity Alcohol Resistant Concentrate) were assayed. OPDtox™ retained enzymatic activity in all of the fire fighting foams and hydrolyzed Demeton-S. The Table below compares the specific activity of OPDtox™ in each type of fire fighting foam.

TABLE 3

Specific activity of OPDtox ™ in the fire fighting foams

| Material | U/mg* | % activity when compared to water |
| --- | --- | --- |
| Water | 3.12 ± 0.16 | 100 |
| Fluoroprotein | 2.87 ± 0.27 | 92 |
| Regular Protein | 3.27 ± 0.18 | 105 |
| Aqueous Film-Forming | 2.95 ± 0.30 | 95 |
| Alcohol Resistant | 3.36 ± 0.91 | 108 |
| Target 7 ® | 1.66 ± 0.39 | 53 |
| Silv-Ex ® | 2.28 ± 0.22 | 73 |

*U = µmol/min

Conclusions from this assay were the successful incorporation of active OPDtox™ into all fire fighting foams, with all compositions demonstrating catalytic activity. Each of the OPDtox™-ANSUL® fire fighting foams displayed enzyme activity and detoxified Demeton-S. In some cases, the activity was enhanced when compared to using a water formulation. The 3% Regular Protein Concentrate and the 3×3 Low Viscosity Alcohol Resistant Concentrate demonstrated the most activity when used with OPDtox™

To determine the effectiveness of OPDtox™ formulated into ANSUL® fire fighting foam, the following solutions were prepared as shown in the Table below.

TABLE 4

Solutions

| Solution | Formulation |
|---|---|
| Paraoxon | 25 ml diH20 added to 100 mg paraoxon and set on shaker for at least 72 hours |
| 200 mM CHES, pH 9.0, sterile | 4.15 g + 80 mL ddH20; adjusted to pH 9.0 with NaOH; brought to 100 mL total volume with ddH20 |
| CHES working solutions | 200 mM CHES diluted to 20 mM and 40 mM |

Control samples were prepared as follows. 1.35 ml of each formulated fire fighting solution was added into a 2 ml microtube in triplicate. 1.35 ml water was also added into a 2 ml microtube in triplicate. 150 μL of the paraoxon solution was added into each tube (i.e., 0.03% V/V solution). All tubes were closed and placed onto a shaker.

Assay samples were prepared as follows. 2.22 mg/mL and 0.22 mg/mL solutions of OPDtox™ in ANSUL® fire fighting foam was formulated as described in Table 1. 2.22 mg/mL and 0.22 mg/mL solutions of OPDtox™ in water were also prepared. 1.35 mL of each OPDtox™ solution was placed into a 2 ml microtube in triplicate. 150 μL of the paraoxon solution was placed into each tube. All tubes were closed and agitated on a shaker.

Analysis was conducted as follows. 100 μL was taken out of each microtube and added to 900 μL of isopropyl alcohol in a GC vial, at time points 1 min, 15 min, 30 min, 1 hr, 2 hr, 3 hr, 4 hr, and 24 hr. The samples were analyzed by gas chromatography. The loss of the paraoxon peak was monitored. An initial rate slope along with a time to completion endpoint was used to calculate specific activity.

The following fire fighting foams were assayed: 3% Regular Protein Concentrate, 3% Fluoroprotein Concentrate, 3% Aqueous Film-Forming Concentrate, and 3×3 Low Viscosity Alcohol Resistant Concentrate due to synergism with OPDtox™ as determined previously. In each of the four fire fighting foams that were assayed, OPDtox™ hydrolyzed paraoxon. The various specific activity values for each type of fire fighting foam are shown in the Table below.

TABLE 5

Specific activity of OPDtox ™ in the fire fighting foams

| Foam | OPDtox ™ (mg/mL) | U (μmol/min) | U/mg |
|---|---|---|---|
| Water | 0.2 | 232.07 ± 19.64 | 1160.33 ± 98.18 |
| | 0.0 | 9.30 ± 7.94 | N/A |
| Regular Protein | 0.2 | 482.80 ± 24.10 | 2414.00 ± 120.50 |
| | 0.0 | 50.17 ± 15.47 | N/A |
| Fluoroprotein | 0.2 | 468.80 ± 23.40 | 2344.00 ± 117.00 |
| | 0.0 | 29.40 ± 1.50 | N/A |
| Alcohol Resistant | 0.2 | 64.83 ± 5.85 | 324.17 ± 29.24 |
| | 0.0 | 26.20 ± 13.89 | N/A |
| Aqueous Film-Forming | 0.2 | 58.93 ± 2.74 | 294.67 ± 13.71 |
| | 0.0 | 17.80 ± 18.24 | N/A |

Activity for the fire fighting foams comprising several concentrations of OPDtox™ and water controls up to 120 minutes are shown in the Tables below.

TABLE 6

Activity of Water plus OPDtox ™

| Time (min) | 2 mg/ml OPDtox ™ | 0.2 mg/ml OPDtox ™ | No OPDtox ™ |
|---|---|---|---|
| 1 | 8.55 | 13.23 | 13.15 |
| 15 | 0 | 12.41 | 13.44 |
| 30 | 0 | 10.07 | 12.28 |
| 60 | 0 | 0 | 12.80 |
| 120 | 0 | 0 | 12.20 |

TABLE 7

Activity of Fluoroprotein plus OPDtox ™

| Time (min) | 2 mg/ml OPDtox ™ | 0.2 mg/ml OPDtox ™ | No OPDtox ™ |
|---|---|---|---|
| 1 | 8.37 | 14.037 | 14.12 |
| 15 | 0 | 3.36 | 12.38 |
| 30 | 0 | 0.35 | 12.37 |
| 60 | 0 | 0 | 12.02 |
| 120 | 0 | 0 | 11.61 |

TABLE 8

Activity of Regular Protein plus OPDtox ™

| Time (min) | 2 mg/ml OPDtox ™ | 0.2 mg/ml OPDtox ™ | No OPDtox ™ |
|---|---|---|---|
| 1 | 2.78 | 8.75 | 13.36 |
| 15 | 0 | 1.96 | 10.45 |
| 30 | 0 | 0.16 | 10.13 |
| 60 | 0 | 0 | 9.83 |
| 120 | 0 | 0 | 9.35 |

TABLE 9

Activity of Aqueous Film-Forming plus OPDtox ™

| Time (min) | 2 mg/ml OPDtox ™ | 0.2 mg/ml OPDtox ™ | No OPDtox ™ |
|---|---|---|---|
| 1 | 1.95 | 7.69 | 11.84 |
| 15 | 0 | 4.77 | 9.58 |
| 30 | 0 | 4.06 | 8.63 |
| 60 | 0 | 3.70 | 8.11 |
| 120 | 0 | 3.45 | 7.81 |

TABLE 10

Activity of Alcohol Resistant plus OPDtox ™

| Time (min) | 2 mg/ml OPDtox ™ | 0.2 mg/ml OPDtox ™ | No OPDtox ™ |
|---|---|---|---|
| 1 | 2.18 | 9.98 | 13.60 |
| 15 | 0.06 | 8.41 | 12.45 |
| 30 | 0 | 7.25 | 12.78 |
| 60 | 0 | 6.01 | 11.79 |
| 120 | 0 | 5.17 | 9.80 |

Conclusions from this assay were that each of the ANSUL® fire fighting foams displayed enzyme activity and detoxified paraoxon. Also, accurate measurements of the 2 mg/ml OPDtox™ solutions were affected due to the rapid decontamination. All 2 mg/ml OPDtox™ concentrations completely hydrolyzed the paraoxon by the first sampling time point of 15 minutes. The Regular Protein and Fluoroprotein fire fighting foams yielded the most enzyme activity.

The ability of OPDtox™ to be formulated directly into the ANSUL® fire fighting foam concentrate before water dilution was assayed. Solutions of paraoxon, 200 mM CHES, and CHES working solutions were prepared as shown in Table 4.

Assay samples were prepared as follows. A 74 mg/ml solution of OPDtox™ in ANSUL® fire fighting foam concentrate was prepared. The solution was left to sit at room temperature for 4 hours. The solutions were diluted out to 3% OPDtox™ in foam concentrate and 97% water. 1.35 ml of each OPDtox™ solution was added into a 2 ml microtube in triplicate. 150 µl of the paraoxon solution was added into each tube. All tubes were closed and placed onto a shaker.

The analysis was as follows. 100 µl was taken out of each microtube and added to 900 µl of isopropyl alcohol in a GC vial at time points 1 min, 15 min, 30 min, 1 hr, 2 hr, 3 hr, 4 hr, and 24 hr. The samples were analyzed by gas chromatography. The loss of the paraoxon peak was monitored. An initial rate slope was determined and used to calculate specific activity.

The following fire fighting foams were assayed: 3% Regular Protein Concentrate, 3% Fluoroprotein Concentrate, 3% Aqueous Film-Forming Concentrate, and 3×3 Low Viscosity Alcohol Resistant Concentrate due to synergism with OPDtox™ as determined previously. In each of the four fire fighting foams that were assayed, OPDtox™ hydrolyzed paraoxon. The various specific activity values for each type of fire fighting foam are shown in the Table below.

TABLE 11

Specific activity of OPDtox ™ in the fire fighting foams

| Foam | OPDtox ™ (mg/mL) | U (µmol/min) | U/mg |
|---|---|---|---|
| Water | 2.0 | 965.50 ± 48.30 | 482.75 ± 24.15 |
| | 0.2 | 232.07 ± 19.64 | 1160.33 ± 98.18 |
| Aqueous Film-Forming | 2.0 | 245.3 ± 26.06 | 122.65 ± 13.03 |
| | 0.2 | 22.00 ± 14.04 | 110.00 ± 70.18 |
| Alcohol Resistant | 2.0 | 237.07 ± 115.70 | 118.53 ± 57.85 |
| | 0.2 | 35.30 ± 52.42 | 176.50 ± 262.12 |
| Fluoroprotein | 2.0 | 222.60 ± 50.70 | 111.30 ± 25.35 |
| | 0.2 | 65.70 ± 21.21 | 328.50 ± 106.03 |
| Regular Protein | 2.0 | 219.60 ± 8.55 | 109.80 ± 4.27 |
| | 0.2 | 62.63 ± 31.04 | 313.17 ± 155.22 |

Activity for the fire fighting foams comprising several concentrations of OPDtox™ and water controls up to 120 minutes are shown in the Tables below.

TABLE 12

Activity of Fluoroprotein plus OPDtox ™

| Time (min) | 2 mg/ml OPDtox ™ | 0.2 mg/ml OPDtox ™ |
|---|---|---|
| 1 | 14.08 | 13.43 |
| 15 | 10.29 | 12.31 |
| 30 | 7.18 | 11.52 |
| 60 | 3.16 | 9.17 |
| 120 | 0.82 | 7.76 |
| 180 | 0.23 | 5.97 |
| 240 | 0.00 | 5.91 |

TABLE 13

Activity of Regular Protein plus OPDtox ™

| Time (min) | 2 mg/ml OPDtox ™ | 0.2 mg/ml OPDtox ™ |
|---|---|---|
| 1 | 14.39 | 13.86 |
| 15 | 11.39 | 12.51 |
| 30 | 8.03 | 12.03 |
| 60 | 4.23 | 10.66 |
| 120 | 1.46 | 8.61 |
| 180 | 0.57 | 7.70 |
| 240 | 0.18 | 3.32 |

TABLE 14

Activity of Aqueous Film-Forming plus OPDtox ™

| Time (min) | 2 mg/ml OPDtox ™ | 0.2 mg/ml OPDtox ™ |
|---|---|---|
| 1 | 9.23 | 11.01 |
| 15 | 3.87 | 10.53 |
| 30 | 2.08 | 10.37 |
| 60 | 1.11 | 10.09 |
| 120 | 0.65 | 9.44 |
| 180 | 0.55 | 8.91 |
| 240 | 0.48 | 8.71 |

TABLE 15

Activity of Alcohol Resistant plus OPDtox ™

| Time (min) | 2 mg/ml OPDtox ™ | 0.2 mg/ml OPDtox ™ |
|---|---|---|
| 1 | 9.46 | 11.33 |
| 15 | 5.57 | 10.73 |
| 30 | 2.19 | 11.34 |
| 60 | 2.16 | 9.84 |
| 120 | 1.56 | 8.90 |
| 180 | 1.00 | 8.71 |
| 240 | 1.04 | 8.73 |

The conclusions from this assay were that each of the ANSUL® fire fighting foams displayed enzyme activity and detoxified paraoxon. Also, the reaction rates may have been slower upon adding OPDtox™ directly to the foam concentrates, possibly due to a side reaction with OPDtox™ in the foam concentrate.

In conjunction with the development of the fire fighting material(s) described herein, it was also discovered that the enzyme additive remained stable in the fire fighting material(s) for an extended period of time (e.g., weeks, months). Some of the fire fighting material(s) described herein, such as 3% Regular Protein Concentrate and 3% Fluoroprotein Concentrate, are protein based (e.g., comprise a hydrolyzed protein). As described above, these fire fighting materials incorporated a decontaminating chemical additive that also comprises a proteinaceous material. The decontaminating chemical additive comprised an unpurified, killed (e.g., sterilized) bacterial source (e.g., a spray-dried bacterial preparation) of an organophosphorus decontamination enzyme. Based on the assays described above, the combination of the protein-based fire fighting material(s) and the bacterial source may provide a stable, fast-acting, and/or long-lasting decontamination ability. Such bacterial source of a decontaminating chemical additive may be added to other, non-fire fighting decontamination fluid formulations.

What is claimed is:

1. A decontamination system for an object, comprising:
a supply of a decontamination fluid, the decontamination fluid comprising:
a liquid carrier; and
a decontaminating chemical additive mixed with the liquid carrier, the decontaminating chemical additive comprising an organophosphorus compound-degrading enzyme; and
a liquid applicator operatively associated to the supply of the decontamination fluid, wherein the liquid applicator applies the decontamination fluid to the object to be decontaminated;
a decontamination fluid flow control system for conveying the decontamination fluid from the supply of the decontamination fluid to the liquid applicator, wherein the decontamination fluid flow control system comprises:
a recirculation system for recovering decontamination fluid for re-use after application by the liquid applicator, wherein the recirculation system comprises:
a liquid collector that collects the decontamination fluid after application by the liquid applicator;
a fluid conduit that conveys the collected decontamination fluid from the liquid collector;
a decontamination reactor that:
receives the collected decontamination fluid, and detoxifies a contaminant in the collected decontamination fluid;
an analyzer operably associated with the detoxified decontaminated fluid to determine a level of residual contamination in the detoxified decontaminated fluid;
a waste container for decontamination fluid;
a fluid flow control device to selectively direct the detoxified decontaminated fluid to at least one of the liquid applicator and the waste container;
a fluid conduit for conveying the detoxified decontamination fluid to at least one of the liquid applicator and the waste container; and
a plurality of pumps operatively associated with one or more of the liquid collector, the fluid conduit that conveys the collected decontamination fluid from the liquid collector, the decontamination reactor, the analyzer, the fluid flow control device, and the fluid conduit for conveying the detoxified decontamination fluid, wherein the pumps provide impetus to flow decontamination fluid through the recirculation system.

2. The decontamination system for an object of claim 1, wherein the decontamination fluid flow control system comprises:
a liquid temperature controller that receives the decontamination fluid from the supply of the decontamination fluid and maintains the decontamination fluid at a temperature suitable for activity of the decontaminating chemical additive;
a fluid conduit that flows the decontamination fluid from the liquid temperature controller to the liquid applicator; and
a pump operatively associated with at least one of the fluid conduit, the liquid temperature controller, the supply of the decontamination fluid, and the liquid applicator, wherein the pump provides impetus to flow the decontamination fluid through the decontamination fluid flow control system.

3. The decontamination system for an object of claim 1, wherein the decontamination reactor comprises:

a reaction chamber;
an inlet for transmitting decontamination fluid into the reaction chamber;
a support component within the reactor chamber capable of detoxifying a contaminant in the decontamination fluid; and
an outlet for transmitting the detoxified decontamination fluid from the reaction chamber.

4. The decontamination system for an object of claim 1, wherein the recirculation system further comprises a separator for removing solids from decontamination fluid, wherein the separator is operatively associated with at least one of the liquid collector, the fluid conduit that conveys the collected decontamination fluid from the liquid collector, the decontamination reactor, the analyzer, the fluid flow control device, the fluid conduit for conveying the detoxified decontamination fluid, and one or more of the pumps.

5. The decontamination system for an object of claim 1, further comprising a liquid sprayer frame for supporting the liquid applicator in a position to allow the liquid applicator to apply the decontamination fluid onto the object to be decontaminated.

6. The decontamination system for an object of claim 5, wherein the liquid sprayer frame comprises:
at least four vertical support legs positioned to allow the object to be between at least two of the vertical support legs;
at least four connecting devices, each of which is attached to a different vertical support leg;
at least four horizontal brace members, the ends of each horizontal brace member being attached to the connecting devices to form a generally rectangular shape by the horizontal brace members;
at least one movable connecting device attached to each different vertical support leg; at least two side rails, each end of each side rail attached to a different movable connecting device that is attached to a vertical support leg;
at least one movable connecting device attached to each different side rail;
at least one cross-member, each end of the cross member attached to a different movable connection device attached to a side rail;
a movable connecting device interconnecting the liquid applicator to at least one of the cross member and the side rail;
wherein the movement of the movable connecting device is attached to a vertical support leg, the movable connecting device is attached to a side rail, the movable connecting device interconnects the liquid applicator, or a combination thereof, positioning the liquid applicator to apply the decontamination fluid onto the object to be decontaminated.

7. The decontamination system for an object of claim 1, further comprising a chamber to at least partially enclose the object to be decontaminated.

8. The decontamination system for an object of claim 1, further comprising at least one fluid level controller.

9. The decontamination system for an object of claim 1, wherein the decontaminating chemical additive further comprises another enzyme, a coenzyme, an enzyme activator, a cellular material, an antibody, a salt, a pH buffer, an antibiological agent, a reaction detection agent, a caustic agent, or a combination thereof.

10. The decontamination system for an object of claim 1, wherein the decontamination fluid comprises a fire fighting foam.

11. A decontamination system for an object, comprising:
a supply of a decontamination fluid, the decontamination fluid comprising:
a liquid carrier; and
a decontaminating chemical additive mixed with the liquid carrier, wherein the decontaminating chemical additive comprises an enzyme, a cellular material, an antibiological peptidic agent, or a combination thereof;
a liquid applicator operatively associated to the supply of the decontamination fluid, wherein the liquid applicator applies the decontamination fluid to the object to be decontaminated;
a liquid sprayer frame for supporting the liquid applicator in a position to allow the liquid applicator to apply the decontamination fluid onto the object to be decontaminated;
a decontamination fluid flow control system for conveying the decontamination fluid from the supply of the decontamination fluid to the liquid applicator, wherein the decontamination fluid flow control system comprises:
a recirculation system for recovering decontamination fluid for re-use after application by the liquid applicator, wherein the recirculation system comprises:
a liquid collector that collects the decontamination fluid after application by the liquid applicator;
a fluid conduit that conveys the collected decontamination fluid from the liquid collector;
a decontamination reactor that:
receives the collected decontamination fluid, and detoxifies a contaminant in the collected decontamination fluid;
an analyzer operably associated with the detoxified decontaminated fluid to determine a level of residual contamination in the detoxified decontaminated fluid;
a waste container for decontamination fluid;
a fluid flow control device to selectively direct the detoxified decontaminated fluid to at least one of the liquid applicator and the waste container;
a fluid conduit for conveying the detoxified decontamination fluid to at least one of the liquid applicator and the waste container; and
a plurality of pumps operatively associated with one or more of the liquid collector, the fluid conduit that conveys the collected decontamination fluid from the liquid collector, the decontamination reactor, the analyzer, the fluid flow control device, and the fluid conduit for conveying the detoxified decontamination fluid, wherein the pumps provides impetus to flow decontamination fluid through the recirculation system; and
at least one fluid level controller.

12. The decontamination system for an object of claim 11, wherein the recirculation system further comprises a separator for removing solids from decontamination fluid, wherein the separator is operatively associated with at least one of the liquid collector, the fluid conduit that conveys the collected decontamination fluid from the liquid collector, the decontamination reactor, the analyzer, the fluid flow control device, the fluid conduit for conveying the detoxified decontamination fluid, and one or more of the pumps.

13. The decontamination system for an object of claim 11, wherein the enzyme comprises an esterase, a lipolytic enzyme, a peptidase, a lysozyme, or a combination thereof.

14. A decontamination system for an object, comprising:
a supply of a decontamination fluid, the decontamination fluid comprising:
- a liquid carrier; and
- a decontaminating chemical additive mixed with the liquid carrier, the decontaminating chemical additive comprising an organophosphorus compound-degrading enzyme; and a liquid applicator operatively associated to the supply of the decontamination fluid, wherein the liquid applicator applies the decontamination fluid to the object to be decontaminated;

a liquid sprayer frame for supporting the liquid applicator in a position to allow the liquid applicator to apply the decontamination fluid onto the object to be decontaminated, wherein the liquid sprayer frame comprises:
- at least four vertical support legs positioned to allow the object to be between at least two of the vertical support legs;
- at least four connecting devices, each of which is attached to a different vertical support leg;
- at least four horizontal brace members, the ends of each horizontal brace member being attached to the connecting devices to form a generally rectangular shape by the horizontal brace members;
- at least one movable connecting device attached to each different vertical support leg;
- at least two side rails, each end of each side rail attached to a different movable connecting device that is attached to a vertical support leg;
- at least one movable connecting device attached to each different side rail;
- at least one cross-member, each end of the cross member attached to a different movable connection device attached to a side rail;
- a movable connecting device interconnecting the liquid applicator to at least one of the cross member and the side rail;
- wherein the movement of the movable connecting device is attached to a vertical support leg, the movable connecting device is attached to a side rail, the movable connecting device interconnects the liquid applicator, or a combination thereof, positioning the liquid applicator to apply the decontamination fluid onto the object to be decontaminated.

* * * * *